(12) United States Patent
Busby et al.

(10) Patent No.: US 9,881,880 B2
(45) Date of Patent: Jan. 30, 2018

(54) TAMPER-PROOF ELECTRONIC PACKAGES WITH STRESSED GLASS COMPONENT SUBSTRATE(S)

(71) Applicant: INTERNATIONAL BUSINESS MACHINES CORPORATION, Armonk, NY (US)

(72) Inventors: James A. Busby, New Paltz, NY (US); Silvio Dragone, Winterthur (CH); Michael A. Gaynes, Vestal, NY (US); Kenneth P. Rodbell, Sandy Hook, CT (US); William Santiago-Fernandez, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/154,088

(22) Filed: May 13, 2016

(65) Prior Publication Data

US 2017/0330844 A1    Nov. 16, 2017

(51) Int. Cl.
*G01R 31/02* (2006.01)
*H01L 23/00* (2006.01)
(Continued)

(52) U.S. Cl.
CPC ............ *H01L 23/576* (2013.01); *G06F 21/86* (2013.01); *H01L 21/4803* (2013.01);
(Continued)

(58) Field of Classification Search
CPC . H01L 23/576; H01L 21/4803; H01L 23/053; H01L 23/08; H01L 24/32;
(Continued)

(56) References Cited

U.S. PATENT DOCUMENTS 3,165,569 A    1/1965  Bright et al.
4,097,894 A *  6/1978  Tanner .................. H04N 7/161
                                                    200/61.08
(Continued)

FOREIGN PATENT DOCUMENTS

CN    2014-30639 Y    3/2010
CN    10-4346587 A    2/2015
(Continued)

OTHER PUBLICATIONS

Toughened Glass, available at http://web.archive.org/web/20140605093019/https://en.wikipedia.org/wiki/Toughened_glass on Jun. 5, 2014.*

(Continued)

*Primary Examiner* — Daniel Miller
(74) *Attorney, Agent, or Firm* — Teddi Maranzano; Kevin P. Radigan, Esq.; Heslin, Rothenberg, Farley & Mesiti, P.C.

(57) ABSTRACT

Tamper-proof electronic packages and fabrication methods are provided which include a glass substrate. The glass substrate is stressed glass with a compressively-stressed surface layer. Further, one or more electronic components are secured to the glass substrate within a secure volume of the tamper-proof electronic package. In operation, the glass substrate is configured to fragment with an attempted intrusion event into the electronic package, and the fragmenting of the glass substrate also fragments the electronic component(s) secured to the glass substrate, thereby destroying the electronic component(s). In certain implementations, the glass substrate has undergone ion-exchange processing to provide the stressed glass. Further, the electronic package may include an enclosure, and the glass substrate may be located within the secure volume separate from the enclosure, or alternatively, the enclosure may be a stressed glass (Continued)

enclosure, an inner surface of which is the glass substrate for the electronic component(s).

13 Claims, 10 Drawing Sheets

(51) Int. Cl.
| H05K 1/03 | (2006.01) |
| H05K 1/18 | (2006.01) |
| H05K 3/30 | (2006.01) |
| H01L 23/053 | (2006.01) |
| H01L 23/08 | (2006.01) |
| H01L 21/48 | (2006.01) |
| G06F 21/86 | (2013.01) |

(52) U.S. Cl.
CPC ............ *H01L 23/053* (2013.01); *H01L 23/08* (2013.01); *H01L 24/32* (2013.01); *H01L 24/83* (2013.01); *H05K 1/0306* (2013.01); *H05K 1/181* (2013.01); *H05K 3/303* (2013.01); *H01L 2224/32225* (2013.01); *H01L 2224/8385* (2013.01); *H01L 2924/0665* (2013.01); *H01L 2924/1434* (2013.01); *H05K 2201/10159* (2013.01)

(58) Field of Classification Search
CPC ....... H01L 24/83; G06F 21/86; H05K 1/0306; H05K 1/181; H05K 3/303
See application file for complete search history.

(56) References Cited

U.S. PATENT DOCUMENTS

| | | | |
|---|---|---|---|
| 4,160,503 A | 7/1979 | Ohlbach |
| 4,211,324 A | 7/1980 | Ohlbach |
| 4,324,823 A | 4/1982 | Ray, III |
| 4,496,900 A | 1/1985 | Di Stefano et al. |
| 4,516,679 A | 5/1985 | Simpson |
| 4,593,384 A | 6/1986 | Kleijne |
| 4,609,104 A | 9/1986 | Kasper et al. |
| 4,653,252 A | 3/1987 | Van de Haar et al. |
| 4,677,809 A | 7/1987 | Long et al. |
| 4,691,350 A | 9/1987 | Kleijne et al. |
| 4,807,284 A | 2/1989 | Kleijne |
| 4,811,288 A | 3/1989 | Kleijne et al. |
| 4,860,351 A | 8/1989 | Weingart |
| 4,865,197 A | 9/1989 | Craig |
| 5,009,311 A | 4/1991 | Schenk |
| 5,027,397 A | 6/1991 | Double et al. |
| 5,060,114 A | 10/1991 | Feinberg et al. |
| 5,075,822 A | 12/1991 | Baumler et al. |
| 5,117,457 A | 5/1992 | Comerford et al. |
| 5,159,629 A | 10/1992 | Double et al. |
| 5,185,717 A | 2/1993 | Mori |
| 5,201,868 A | 4/1993 | Johnson |
| 5,201,879 A | 4/1993 | Steele et al. |
| 5,211,618 A | 5/1993 | Stoltz |
| 5,239,664 A | 8/1993 | Verrier et al. |
| 5,389,738 A | 2/1995 | Piosenka et al. |
| 5,406,630 A | 4/1995 | Piosenka et al. |
| 5,506,566 A | 4/1996 | Oldfield et al. |
| 5,568,124 A | 10/1996 | Joyce et al. |
| 5,594,439 A | 1/1997 | Swanson |
| 5,675,319 A | 10/1997 | Rivenberg et al. |
| 5,715,652 A | 2/1998 | Stahlecker |
| 5,761,054 A | 6/1998 | Kuhn |
| 5,813,113 A | 9/1998 | Stewart et al. |
| 5,858,500 A | 1/1999 | MacPherson |
| 5,880,523 A | 3/1999 | Candelore |
| 5,988,510 A | 11/1999 | Tuttle et al. |
| 6,121,544 A | 9/2000 | Petsinger |
| 6,195,267 B1 | 2/2001 | MacDonald, Jr. et al. |
| 6,201,296 B1 | 3/2001 | Fries et al. |
| 6,261,215 B1 | 7/2001 | Imer |
| 6,301,096 B1 | 10/2001 | Wozniczka |
| 6,355,316 B1 * | 3/2002 | Miller ................. G06F 21/87 428/13 |
| 6,384,397 B1 | 5/2002 | Takiar et al. |
| 6,424,954 B1 | 7/2002 | Leon |
| 6,438,825 B1 | 8/2002 | Kuhm |
| 6,469,625 B1 | 10/2002 | Tomooka |
| 6,473,995 B2 | 11/2002 | Miyakawa et al. |
| 6,512,454 B2 | 1/2003 | Miglioli et al. |
| 6,686,539 B2 | 2/2004 | Farquhar et al. |
| 6,746,960 B2 | 6/2004 | Goodman et al. |
| 6,798,660 B2 | 9/2004 | Moss et al. |
| 6,853,093 B2 | 2/2005 | Cohen et al. |
| 6,879,032 B2 | 4/2005 | Rosenau et al. |
| 6,929,900 B2 | 8/2005 | Farquhar et al. |
| 6,946,960 B2 | 9/2005 | Sisson et al. |
| 6,957,345 B2 | 10/2005 | Cesana et al. |
| 6,970,360 B2 | 11/2005 | Sinha |
| 6,985,362 B2 | 1/2006 | Mori et al. |
| 6,991,961 B2 | 1/2006 | Hubbard et al. |
| 6,996,953 B2 | 2/2006 | Perreault et al. |
| 7,005,733 B2 | 2/2006 | Kommerling et al. |
| 7,015,823 B1 | 5/2006 | Gillen et al. |
| 7,054,162 B2 | 5/2006 | Benson et al. |
| 7,057,896 B2 | 6/2006 | Matsuo et al. |
| 7,094,143 B2 | 8/2006 | Wolm et al. |
| 7,094,459 B2 | 8/2006 | Takahashi |
| 7,095,615 B2 | 8/2006 | Nichols |
| 7,156,233 B2 | 1/2007 | Clark et al. |
| 7,180,008 B2 | 2/2007 | Heitmann et al. |
| 7,189,360 B1 | 3/2007 | Ho et al. |
| 7,214,874 B2 | 5/2007 | Dangler et al. |
| 7,247,791 B2 | 7/2007 | Kulpa |
| 7,304,373 B2 | 12/2007 | Taggart et al. |
| 7,310,737 B2 | 12/2007 | Patel et al. |
| 7,465,887 B2 | 12/2008 | Suzuki et al. |
| 7,475,474 B2 | 1/2009 | Heitmann et al. |
| 7,515,418 B2 | 4/2009 | Straznicky et al. |
| 7,549,064 B2 | 6/2009 | Elbert et al. |
| 7,640,658 B1 | 1/2010 | Pham et al. |
| 7,643,290 B1 | 1/2010 | Narasimhan et al. |
| 7,663,883 B2 | 2/2010 | Shirakami et al. |
| 7,672,129 B1 | 3/2010 | Ouyang et al. |
| 7,731,517 B2 | 6/2010 | Lee et al. |
| 7,746,657 B2 | 6/2010 | Oprea et al. |
| 7,760,086 B2 | 7/2010 | Hunter et al. |
| 7,768,005 B2 | 8/2010 | Condorelli et al. |
| 7,783,994 B2 | 8/2010 | Ball et al. |
| 7,787,256 B2 | 8/2010 | Chan et al. |
| 7,868,411 B2 | 1/2011 | Eaton et al. |
| 7,898,413 B2 | 3/2011 | Hsu et al. |
| 7,901,977 B1 | 3/2011 | Angelopoulos et al. |
| 7,947,911 B1 | 5/2011 | Pham et al. |
| 7,978,070 B2 | 7/2011 | Hunter |
| 8,006,101 B2 | 8/2011 | Crawford |
| 8,084,855 B2 | 12/2011 | Lower et al. |
| 8,094,450 B2 | 1/2012 | Cole et al. |
| 8,101,267 B2 | 1/2012 | Moh et al. |
| 8,133,621 B2 | 3/2012 | Wormald et al. |
| 8,199,506 B2 | 6/2012 | Janik et al. |
| 8,287,336 B2 | 10/2012 | Dangler et al. |
| 8,325,486 B2 | 12/2012 | Arshad et al. |
| 8,516,269 B1 | 8/2013 | Hamlet et al. |
| 8,589,703 B2 | 11/2013 | Lee et al. |
| 8,646,108 B2 | 2/2014 | Shiakallis et al. |
| 8,659,506 B2 | 2/2014 | Nomizo |
| 8,659,908 B2 | 2/2014 | Adams et al. |
| 8,664,047 B2 | 3/2014 | Lower et al. |
| 8,716,606 B2 | 5/2014 | Kelley et al. |
| 8,797,059 B2 | 8/2014 | Boday et al. |
| 8,836,509 B2 | 9/2014 | Lowy |
| 8,853,839 B2 | 10/2014 | Gao et al. |
| 8,879,266 B2 | 11/2014 | Jarvis et al. |
| 8,890,298 B2 | 11/2014 | Buer et al. |
| 8,947,889 B2 | 2/2015 | Kelley et al. |
| 8,961,280 B2 | 2/2015 | Dangler et al. |
| 9,003,199 B2 | 4/2015 | Dellmo et al. |
| 9,011,762 B2 | 4/2015 | Seppa et al. |

(56) References Cited

U.S. PATENT DOCUMENTS

| | | |
|---|---|---|
| 9,052,070 B2 | 6/2015 | Davis et al. |
| 9,166,586 B2 | 10/2015 | Carapelli et al. |
| 9,298,956 B2 | 3/2016 | Wade et al. |
| 2001/0050425 A1 | 12/2001 | Beroz et al. |
| 2001/0056542 A1 | 12/2001 | Cesana et al. |
| 2002/0002683 A1 | 1/2002 | Benson |
| 2002/0068384 A1 | 6/2002 | Beroz et al. |
| 2002/0084090 A1 | 7/2002 | Farquhar |
| 2003/0009684 A1 | 1/2003 | Schwenck et al. |
| 2005/0068735 A1 | 3/2005 | Fissore et al. |
| 2005/0111194 A1 | 5/2005 | Sohn et al. |
| 2005/0180104 A1 | 8/2005 | Olesen et al. |
| 2006/0034731 A1 | 2/2006 | Lewis et al. |
| 2006/0072288 A1 | 4/2006 | Stewart et al. |
| 2006/0196945 A1 | 9/2006 | Mendels |
| 2006/0218779 A1 | 10/2006 | Ooba et al. |
| 2007/0064396 A1 | 3/2007 | Oman et al. |
| 2007/0064399 A1 | 3/2007 | Mandel et al. |
| 2007/0108619 A1 | 5/2007 | Hsu |
| 2007/0211436 A1 | 9/2007 | Robinson et al. |
| 2007/0230127 A1 | 10/2007 | Peugh et al. |
| 2007/0268671 A1 | 11/2007 | Brandenburg et al. |
| 2008/0050512 A1 | 2/2008 | Lower et al. |
| 2008/0061972 A1* | 3/2008 | Hwang ............ G06K 19/07381 340/568.2 |
| 2008/0144290 A1 | 6/2008 | Brandt et al. |
| 2008/0159539 A1 | 7/2008 | Huang et al. |
| 2008/0160274 A1 | 7/2008 | Dang et al. |
| 2008/0191174 A1 | 8/2008 | Ehrensvard et al. |
| 2008/0251906 A1 | 10/2008 | Eaton et al. |
| 2009/0073659 A1 | 3/2009 | Peng et al. |
| 2009/0166065 A1 | 7/2009 | Clayton et al. |
| 2010/0088528 A1 | 4/2010 | Sion |
| 2010/0110647 A1 | 5/2010 | Hiew et al. |
| 2010/0177487 A1 | 7/2010 | Arshad et al. |
| 2010/0319986 A1 | 12/2010 | Bleau et al. |
| 2011/0001237 A1 | 1/2011 | Brun et al. |
| 2011/0038123 A1 | 2/2011 | Janik et al. |
| 2011/0103027 A1 | 5/2011 | Aoki et al. |
| 2011/0241446 A1 | 10/2011 | Tucholski |
| 2011/0299244 A1 | 12/2011 | Dede et al. |
| 2012/0050998 A1 | 3/2012 | Klum et al. |
| 2012/0052252 A1* | 3/2012 | Kohli ..................... C03C 17/23 428/174 |
| 2012/0117666 A1 | 5/2012 | Oggioni et al. |
| 2012/0140421 A1 | 6/2012 | Kirstine et al. |
| 2012/0185636 A1 | 7/2012 | Leon et al. |
| 2012/0244742 A1 | 9/2012 | Wertz et al. |
| 2012/0256305 A1 | 10/2012 | Kaufmann et al. |
| 2012/0319986 A1 | 12/2012 | Toh et al. |
| 2012/0320529 A1 | 12/2012 | Loong et al. |
| 2013/0033818 A1 | 2/2013 | Hosoda et al. |
| 2013/0104252 A1 | 4/2013 | Yanamadala et al. |
| 2013/0141137 A1 | 6/2013 | Krutzik et al. |
| 2013/0158936 A1 | 6/2013 | Rich et al. |
| 2013/0170217 A1 | 7/2013 | Lee |
| 2013/0208422 A1 | 8/2013 | Hughes et al. |
| 2013/0235527 A1 | 9/2013 | Wagner et al. |
| 2013/0283386 A1 | 10/2013 | Lee |
| 2014/0022733 A1 | 1/2014 | Lim et al. |
| 2014/0160679 A1 | 6/2014 | Kelty et al. |
| 2014/0184263 A1 | 7/2014 | Ehrenpfordt et al. |
| 2014/0204533 A1 | 7/2014 | Abeyasekera et al. |
| 2014/0321064 A1 | 10/2014 | Bose et al. |
| 2014/0325688 A1 | 10/2014 | Cashin et al. |
| 2015/0007427 A1 | 1/2015 | Dangler et al. |
| 2015/0163933 A1 | 6/2015 | Steiner |
| 2015/0235053 A1 | 8/2015 | Lee et al. |
| 2016/0005262 A1 | 1/2016 | Hirato et al. |
| 2016/0137548 A1 | 5/2016 | Cabral, Jr. et al. |
| 2016/0262253 A1 | 9/2016 | Isaacs et al. |
| 2016/0262270 A1 | 9/2016 | Isaacs et al. |
| 2017/0019987 A1 | 1/2017 | Dragone et al. |

FOREIGN PATENT DOCUMENTS

| | | |
|---|---|---|
| DE | 19816571 A1 | 10/1999 |
| DE | 19816572 A1 | 10/1999 |
| DE | 10-2012-203955 A1 | 9/2013 |
| EP | 0 056 360 A1 | 10/1993 |
| EP | 0 629 497 A2 | 12/1994 |
| EP | 1 184 773 A1 | 3/2002 |
| EP | 1 207 444 A2 | 5/2002 |
| EP | 1 734 578 A1 | 12/2006 |
| EP | 1 968 362 A2 | 9/2008 |
| EP | 2 104 407 A1 | 9/2009 |
| EP | 1 672 464 B1 | 4/2012 |
| EP | 2 560 467 A1 | 2/2013 |
| JP | 61-297035 A | 12/1986 |
| JP | 2000-238141 A | 9/2000 |
| JP | 2013-125807 A | 6/2013 |
| JP | 2013-140112 A | 7/2013 |
| WO | WO 1999/003675 A1 | 1/1999 |
| WO | WO 1999/021142 A1 | 4/1999 |
| WO | WO 2001/063994 A2 | 8/2001 |
| WO | WO 2003/012606 A2 | 2/2003 |
| WO | WO 2003/025080 A1 | 3/2003 |
| WO | WO 2004/040505 A1 | 5/2004 |
| WO | WO 2009/042335 A1 | 4/2009 |
| WO | WO 2009/092472 A1 | 7/2009 |
| WO | WO 2010/128939 A1 | 11/2010 |
| WO | WO 2013/004292 A1 | 1/2013 |
| WO | WO 2013/0189483 A1 | 12/2013 |
| WO | WO 2014/086987 A2 | 6/2014 |
| WO | WO 2014/158159 A1 | 10/2014 |

OTHER PUBLICATIONS

Dragone et al., "Tamper-Respondent Assembly with Sensor Connection Adapter", U.S. Appl. No. 15/268,959, filed Sep. 19, 2016 (45 pages).

Dragone et al., "Vented Tamper-Respondent Assemblies", U.S. Appl. No. 15/275,748, filed Sep. 26, 2016 (53 pages).

Dragone et al., "Tamper-Respondent Assemblies with In Situ Vent Structure(s)", U.S. Appl. No. 15/275,762, filed Sep. 26, 2016 (72 pages).

Busby et al., "Tamper-Respondent Assemblies with Trace Regions of Increased Susceptibility to Breaking", U.S. Appl. No. 15/341,108, filed Nov. 2, 2016 (56 pages).

Brodsky et al., "Enclosure with Inner Tamper-Respondent Sensor(s)", U.S. Appl. No. 15/409,851, filed Jan. 19, 2017 (115 pages).

Brodsky et al., "Tamper-Respondent Assemblies with Enclosure-to-Board Protection", U.S. Appl. No. 15/423,833, filed Feb. 3, 2017 (54 pages).

Holm, Ragnar, "Electric Contacts: Theory and Application", Spinger-Verlag, New York, 4th Edition, 1981 (pp. 10-19).

Clark, Andrew J., "Physical Protection of Cryptographic Devices", Advanced in Cyprtology, Eurocrypt '87, Springer, Berlin Heidelberg (1987) (11 pages).

Halperin et al., "Latent Open Testing of Electronic Packaging", MCMC-194, IEEE (1994) (pp. 83-33).

Simek, Bob, "Tamper Restrictive Thermal Ventilation System for Enclosures Requiring Ventilation and Physical Security", IBM Publication No. IPCOM000008607D, Mar. 1, 1998 (2 pages).

Pamula et al., "Cooling of Integrated Circuits Using Droplet-Based Microfluidics", Association for Computing Machinery (ACM), GLSVLSI'03, Apr. 28-29, 2003 (pp. 84-87).

Saran et al., "Fabrication and Characterization of Thin Films of Single-Walled Carbon Nanotube Bundles on Flexible Plastic Substrates", Journal of the American Chemical Society, vol. 126, No. 14 (Mar. 23, 2004) (pp. 4462-4463).

Khanna P.K. et al., "Studies on Three-Dimensional Moulding, Bonding and Assembling of Low-Temperature-Cofired Ceramics MEMS and MST Applications." Materials Chemistry and Physics, vol. 89, No. 1 (2005) (pp. 72-79).

Drimer et al., "Thinking Inside the Box: System-Level Failures of Tamper Proofing", 2008 IEEE Symposium on Security and Privacy, (Feb. 2008) (pp. 281-295).

(56) References Cited

OTHER PUBLICATIONS

Loher et al., "Highly Integrated Flexible Electronic Circuits and Modules", 3rd International IEEE on Microsystems, Packaging, Assembly & Circuits Technology Conference (Oct. 22-24, 2008) (Abstract Only) (1 page).
Sample et al., "Design of an RFID-Based Battery-Free Programmable Sensing Platform", IEEE Transactions on Instrumentation and Measurement, vol. 57, No. 11, Nov. 2008 (pp. 2608-2615).
Jhang et al., "Nonlinear Ultrasonic Techniques for Non-Destructive Assessment of Micro Damage in Material: A Review", International Journal of Prec. Eng. & Manuf. , vol. 10, No. 1, Jan. 2009 (pp. 123-135).
Anonymous, "Consolidated Non-Volatile Memory in a Chip Stack", IBM Technical Disclosure: IP.com No. IPCOM000185250, Jul. 16, 2009 (6 pages).
Isaacs et al., "Tamper Proof, Tamper Evident Encryption Technology", Pan Pacific Symposium SMTA Proceedings (2013) (9 pages).
Anonymous, "Selective Memory Encryption", IBM Technical Disclosure: IP.com IPCOM000244183, Nov. 20, 2015 (6 pages).
Zhou et al., "Nonlinear Analysis for Hardware Trojan Detection", ICSPCC2015, IEEE (2015) (4 pages).
Harting Mitronics, "Saftey Caps for Payment Terminals", http://harting-mitronics.ch/fileadmin/hartingmitronics/case_studies/Saftey_caps_for_payment_terminals.pdf, downloaded Aug. 2016 (2 pages).
Dangler et al., "Tamper-Respondent Sensors with Formed Flexible Layer(s)", U.S. Appl. No. 14/865,551, filed Sep. 25, 2015 (113 pages).
Brodsky et al., "Overlapping, Discrete Tamper-Respondent Sensors", U.S. Appl. No. 14/865,572, filed Sep. 25, 2015 (114 pages).
Dangler et al., "Tamper-Respondent Assemblies with Region(s) of Increased Susceptibility to Damage", U.S. Appl. No. 14/865,591, filed Sep. 25, 2015 (114 pages).
Brodsky et al., "Circuit Boards and Electronic Packages with Embedded Tamper-Respondent Sensor", U.S. Appl. No. 14/865,610, filed Sep. 25, 2015 (43 pages).
Brodsky et al, "Tamper-Respondent Assemblies", U.S. Appl. No. 14/865,632, filed Sep. 25, 2015 (115 pages).
Brodksky et al., "Enclosure with Inner Tamper-Respondent Sensor(s)", U.S. Appl. No. 14/865,651, filed Sep. 25, 2015 (115 pages).
Fisher et al., "Enclosure with Inner Tamper-Respondent Sensor(s) and Physical Security Element(s)", U.S. Appl. No. 14/865,686, filed Sep. 25, 2015 (114 pages).
Brodsky et al., "Tamper-Respondent Assemblies with Bond Protection", U.S. Appl. No. 14/865,708, filed Sep. 25, 2015 (113 pages).
Brodsky et al., "Circuit Layouts of Tamper-Respondent Sensors", U.S. Appl. No. 14/886,179, filed Oct. 19, 2015 (113 pages).
Isaacs, Phillip Duane, "Tamper-Respondent Assembly with Protective Wrap(s) Over Tamper-Respondent Sensor(s)", U.S. Appl. No. 14/918,691, filed Oct. 21, 2015 (40 pages).

Brodsky et al., "Tamper-Respondent Assemblies with Bond Protection", U.S. Appl. No. 14/941,860, filed Nov. 16, 2015 (108 pages).
Fisher et al., "Enclosure with Inner Tamper-Respondent Sensor(s) and Physical Security Element(s)", U.S. Appl. No. 14/941,872, filed Nov. 16, 2015 (109 pages).
Brodsky et al, "Tamper-Respondent Assemblies", U.S. Appl. No. 14/941,887, filed Nov. 16, 2015 (109 pages).
Brodsky et al., "Circuit Boards and Electronic Packages with Embedded Tamper-Respondent Sensors", U.S. Appl. No. 14/941,908, filed Nov. 16, 2015 (41 pages).
Fisher et al., "Tamper-Respondent Assembly with Vent Structure", U.S. Appl. No. 14/955,283, filed Dec. 1, 2015 (61 pages).
Fisher et al., "Applying Pressure to Adhesive Using CTE Mismatch Between Components", U.S. Appl. No. 14/963,681, filed Dec. 9, 2015 (68 pages).
Brodsky et al., "Tamper-Respondent Assemblies with Enclosure-to-Board Protection", U.S. Appl. No. 14/974,036, filed Dec. 18, 2015 (55 pages).
Busby et al., "Multi-Layer Stack with Embedded Tamper-Detect Protection", U.S. Appl. No. 15/053,336, filed Feb. 25, 2016 (68 pages).
Campbell et al., "Tamper-Proof Electronic Packages With Two-Phase Dielectric Fluid", U.S. Appl. No. 15/139,503, filed Apr. 27, 2016 (60 pages).
Busby et al., "Tamper-Proof Electronic Packages With Stressed Glass Component Substrate(s)", U.S. Appl. No. 15/154,088, filed May 13, 2016 (56 pages).
Brodsky et al., "Circuit Layouts of Tamper-Respondent Sensors", U.S. Appl. No. 15/187,002, filed Jun. 20, 2016 (110 pages).
Brodsky et al., "Tamper-Respondent Assemblies with Enclosure-to-Board Protection", U.S. Appl. No. 15/193,525, filed Jun. 27, 2016 (54 pages).
Fisher et al., "Applying Pressure to Adhesive Using CTE Mismatch Between Components", U.S. Appl. No. 15/193,556, filed Jun. 27, 2016 (71 pages).
Busby et al., "Tamper-Respondent Assembly with Nonlinearity Monitoring", U.S. Appl. No. 15/194,738, filed Jun. 28, 2016 (48 pages).
Dangler et al., "Tamper-Respondent Sensors with Formed Flexible Layer(s)", U.S. Appl. No. 15/249,663, filed Aug. 29, 2016 (109 pages).
Brodsky et al., "Overlapping, Discrete Tamper-Respondent Sensors", U.S. Appl. No. 15/249,671, filed Aug. 29, 2016 (109 pages).
Dangler et al., "Tamper-Respondent Assemblies with Region(s) of Increased Susceptibility to Damage", U.S. Appl. No. 15/249,676, filed Aug. 29, 2016 (110 pages).
Buby et al., "List of IBM Patents and Patent Applications Treated as Related", U.S. Appl. No. 15/154,088, filed May 13, 2016, dated Sep. 16, 2016 (2 pages).
Busby, et al., Final Rejection for U.S. Appl. No. 15/154,077, filed May 13, 2016, dated Jul. 7, 2017 (8 pages).

* cited by examiner

TAMPER-PROOF ELECTRONIC PACKAGES WITH STRESSED GLASS COMPONENT SUBSTRATE(S)

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

SUMMARY

Provided herein, in one or more aspects, is a tamper-proof electronic package which includes: a glass substrate, the glass substrate comprising stressed glass with a compressively-stressed surface layer; at least one electronic component secured to the glass substrate within a secure volume of the tamper-proof electronic package; and wherein the glass substrate fragments with an attempted intrusion event into the tamper-proof electronic package, the fragmenting of the glass substrate also fragmenting the at least one electronic component secured thereto, destroying the at least one electronic component.

In one or more other aspects, a tamper-proof electronic package is provided, which includes: an enclosure defining, at least in part, a secure volume; a glass substrate, the glass substrate comprising stressed glass with a compressively-stressed surface layer; at least one electronic component secured to the glass substrate within the secure volume; and wherein the glass substrate fragments with an attempted intrusion event into the tamper-proof electronic package, the fragmenting of the glass substrate fragmenting the at least one electronic component secured thereto, destroying the at least one electronic component.

In one or more further aspects, a fabrication method is provided which includes fabricating a tamper-proof electronic package. The fabricating includes: a glass substrate, the glass substrate comprising stressed glass with a compressively-stressed surface layer; securing at least one electronic component to the glass substrate, the glass substrate being within a secure volume of the tamper-proof electronic package; and wherein the glass substrate fragments with an attempted intrusion event into the secure volume of the tamper-proof electronic package, the fragmenting of the glass substrate also fragmenting the at least one electronic component secured thereto, destroying the at least one electronic component.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for instance, for establishing a secure volume about an electronic component(s) or electronic assembly to be protected.

Figure 1:
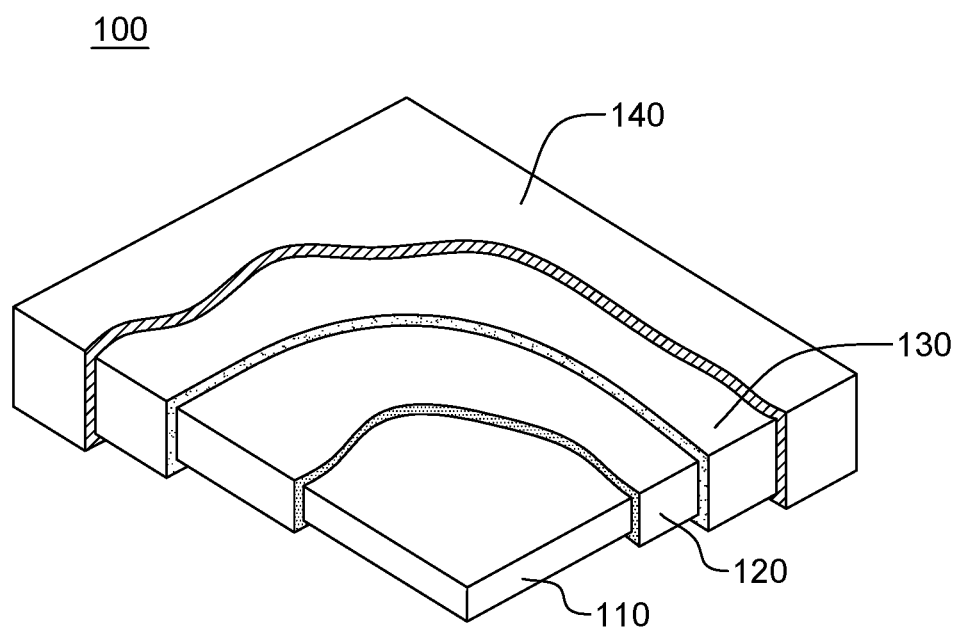
FIG. 1 is a partial cut-away of one embodiment of a tamper-proof electronic package.

Reference is first made to FIG. 1 of the drawings, which illustrates one approach for an electronic package 100 configured as a tamper-proof electronic package for purposes of discussion. In the depicted embodiment, an electronic assembly enclosure 110 is provided containing, for instance, an electronic assembly, which in one embodiment may include a plurality of electronic components, such as an encryption and/or decryption module and associated memory. The encryption and/or decryption module may comprise security-sensitive information with, for instance, access to the information stored in the module requiring use of a variable key, and with the nature of the key being stored in the associated memory within the enclosure.

In one or more implementations, a tamper-proof electronic package such as depicted is configured or arranged to detect attempts to tamper-with or penetrate into electronic assembly enclosure 110. Accordingly, electronic assembly enclosure 110 also includes, for instance, a monitor circuit which, if tampering is detected, activates an erase circuit to erase information stored within the associated memory, as well as the encryption and/or decryption module within the communications card. These components may be mounted on, and interconnected by, a multilayer circuit board, such as a printed circuit board or other multilayer substrate, and be internally or externally powered via a power supply provided within the electronic assembly enclosure.

In the embodiment illustrated, and as one example only, electronic assembly enclosure 110 may be surrounded by a tamper-respondent sensor 120, an encapsulant 130, and an outer, thermally conductive enclosure 140. In one or more implementations, tamper-respondent sensor 120 may include a tamper-respondent laminate that is folded around electronic assembly enclosure 110, and encapsulant 130 may be provided in the form of a molding. Tamper-respondent sensor 120 may include various detection layers, which are monitored through, for instance, a ribbon cable by the enclosure monitor, against sudden violent attempts to penetrate enclosure 110 and damage the enclosure monitor or erase circuit, before information can be erased from the encryption module. The tamper-respondent sensor may be, for example, any such article commercially available or described in various publications and issued patents, or any enhanced article such as disclosed herein.

By way of example, tamper-respondent sensor 120 may be formed as a tamper-respondent laminate comprising a number of separate layers with, for instance, an outermost lamination-respondent layer including a matrix of, for example, diagonally-extending or sinusoidally-extending, conductive or semi-conductive lines printed onto a regular, thin insulating film. The matrix of lines forms a number of continuous conductors which would be broken if attempts are made to penetrate the film. The lines may be formed, for instance, by printing carbon-loaded Polymer Thick Film (PTF) ink onto the film and selectively connecting the lines on each side, by conductive vias, near the edges of the film. Connections between the lines and an enclosure monitor of the communications card may be provided via, for instance, one or more ribbon cables. The ribbon cable itself may be formed of lines of conductive ink printed onto an extension of the film, if desired. Connections between the matrix and the ribbon cable may be made via connectors formed on one edge of the film. As noted, the laminate may be wrapped around the electronic assembly enclosure to define the tamper-respondent sensor 120 surrounding enclosure 110.

In one or more implementations, the various elements of the laminate may be adhered together and wrapped around enclosure 110, in a similar manner to gift-wrapping a parcel, to define the tamper-respondent sensor shape 120. The assembly may be placed in a mold which is then filled with, for instance, cold-pour polyurethane, and the polyurethane may be cured and hardened to form an encapsulant 130. The encapsulant may, in one or more embodiments, completely surround the tamper-respondent sensor 120 and enclosure 110, and thus form a complete environmental seal, protecting the interior of the enclosure. The hardened polyurethane is resilient and increases robustness of the electronic package in normal use. Outer, thermally conductive enclosure 140 may optionally be provided over encapsulant 130 to, for instance, provide further structural rigidity to the electronic package.

When considering tamper-proof packaging, the electronic package needs to maintain defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-2 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs). Security Level 4 cryptographic modules are useful for operation in physically unprotected environments.

To address the demands for ever-improving anti-intrusion technology, and the higher-performance encryption/decryption functions being provided, enhancements to the tamper-proof, tamper-evident packaging for the electronic component(s) or assembly at issue are desired.

Numerous enhancements are described hereinbelow to, for instance, tamper-proof electronic packages and tamper-respondent sensors. Note that the numerous inventive aspects described herein may be used singly, or in any desired combination. Additionally, in one or more implementations, the enhancements to tamper-proof electronic packaging described herein may be provided to work within defined space limitations for existing packages. For instance, one or more of the concepts described may be configured to work with peripheral component interconnect express (PCIe) size limits.

Disclosed hereinbelow with reference to FIGS. 2A-11 are various approaches and/or enhancements to creating, for instance, a secure volume for accommodating one or more electronic components, such as one or more encryption and/or decryption modules and associated components of, for instance, a communications card or other electronic assembly to be protected.

Figure 2A:
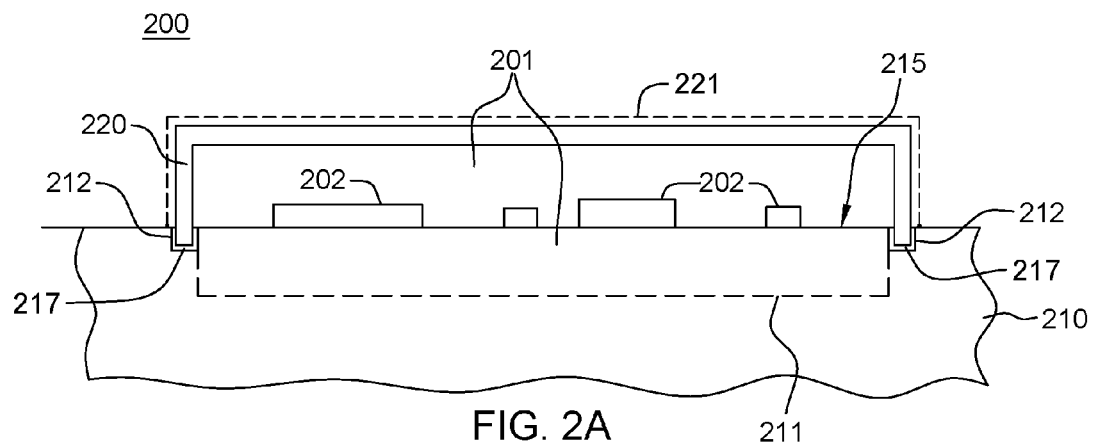
FIG. 2A is a cross-sectional elevational view of another embodiment of a tamper-proof electronic package, or tamper-respondent assembly, which includes (in part) a glass enclosure formed of stressed glass, and a multi-layer circuit board with an embedded tamper-respondent sensor, in accordance with one or more aspects of the present invention.
Figure 2B:
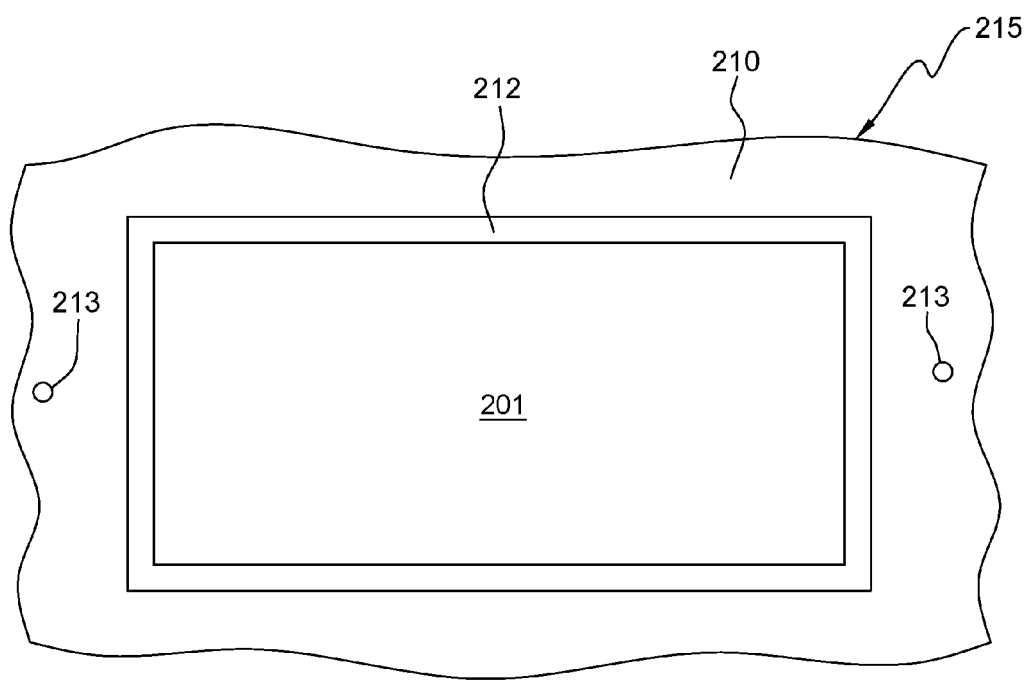
FIG. 2B is a top plan view of the multilayer circuit board of FIG. 2A, depicting one embodiment of the secure volume where defined, in part, within the multilayer circuit board, in accordance with one or more aspects of the present invention.

FIGS. 2A & 2B depict one embodiment of a tamper-proof electronic package 200, or tamper-respondent assembly, which comprises one or more electronic components, such as a circuit 215 and/or electronic devices (or elements) 202 to be protected, in accordance with one or more further aspects of the present invention.

Referring collectively to FIGS. 2A & 2B, circuit 215 resides on or is embedded within a multilayer circuit board 210, which also has an embedded tamper-respondent sensor 211 that facilitates defining, in part, a secure volume 201 associated with multilayer circuit board 210 that (in one or more embodiments) extends into multilayer circuit board 210. In particular, in the embodiment of FIGS. 2A & 2B, secure volume 201 may exist partially within multilayer circuit board 210, and partially above multilayer circuit board 210. One or more electronic devices 202 are mounted to multilayer circuit board 210 within secure volume 201 and may comprise, for instance, one or more encryption modules and/or decryption modules, and/or associated components, to be protected within the tamper-proof electronic package. In one or more implementations, the one or more electronic components to be protected may comprise, for instance, a secure communications card of a computer system.

Tamper-proof electronic package 200 further includes a glass enclosure 220, such as a pedestal-type, stressed glass enclosure, mounted to multilayer circuit board 210 within, for instance, a continuous groove (or trench) 212 formed within an upper surface of multilayer circuit board 210, and secured to the multilayer circuit board 210 via, for instance, a structural adhesive 217 disposed within continuous groove 212. In one or more embodiments, glass enclosure 220 comprises stressed glass with a compressively-stressed surface layer, as described further below. A thermally conductive cap or cover 221 may overlie and couple to outer surfaces of glass enclosure 220, to operate as a heatsink for facilitating cooling the one or more electronic components within the secure volume. As described further below, a tamper-respondent detector (not shown) is also provided within the secure volume to monitor the stressed glass enclosure and identify a tamper intrusion event with, for instance, fragmentation of the stressed glass. Together with the stressed glass, and the tamper-respondent detector, tamper-respondent sensor 211 embedded within multilayer circuit board 210 facilitates defining secure volume 201.

As depicted in FIG. 2B, one or more external circuit connection vias 213 may be provided within multilayer circuit board 210 for electrically connecting to the one or more electronic components within secure volume 201. These one or more external circuit connection vias 213 may electrically connect to one or more external signal lines or planes (not shown) embedded within multilayer circuit board 210 and extending, for instance, into a secure base region of (or below) secure volume 201, as explained further below. Electrical connections to and from secure volume 201 may be provided by coupling to such external signal lines or planes within the multilayer circuit board 210.

As noted, secure volume 201 may be sized to house one or more electronic components to be protected, and may be constructed to extend into multilayer circuit board 210. In one or more implementations, multilayer circuit board 210 includes electrical interconnect within the secure volume 201 defined in the board, for instance, for electrically connecting one or more tamper-respondent layers of the embedded tamper-respondent sensor 211 to associated monitor circuitry also disposed within secure volume 201, along with, for instance, one or more daughter cards, such as memory DIMMs PCIe cards, processor cards, etc.

Note that the packaging embodiment depicted in FIGS. 2A & 2B is presented by way of example only. Other configurations of glass enclosure 220, or multilayer circuit board 210 may be employed, and/or other approaches to coupling glass enclosure 220 and multilayer circuit board 210 may be used. For instance, in one or more alternate implementations, glass enclosure 220 may be securely affixed to an upper surface of multilayer circuit board 210 (without a continuous groove) using, for instance, a structural bonding material such as an epoxy or other adhesive.

Figure 3:
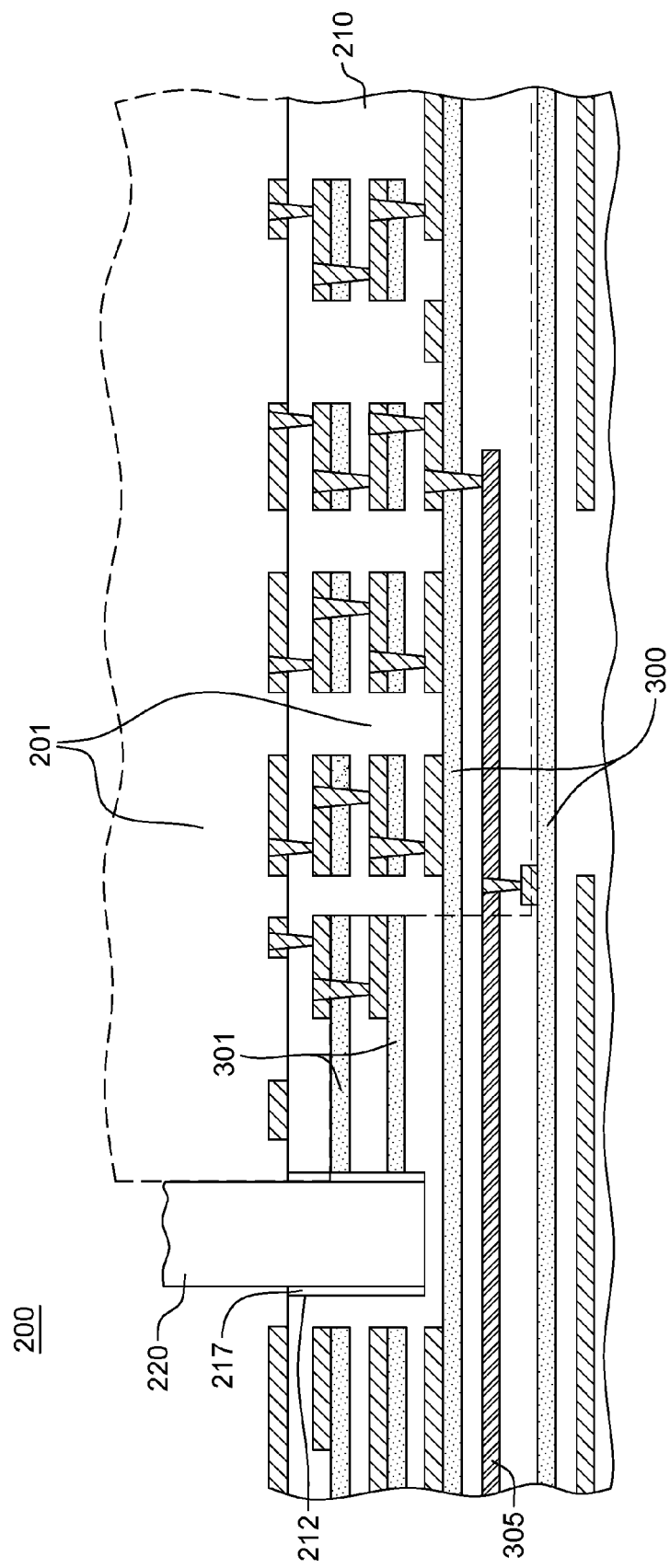
FIG. 3 is a partial cross-sectional elevational view of a more detailed embodiment of the tamper-proof electronic package of FIGS. 2A & 2B comprising (in part) a glass enclosure, and a multilayer circuit board with embedded tamper-respondent sensor, in accordance with one or more aspects of the present invention.

By way of further example, FIG. 3 depicts a partial cross-sectional elevational view of a more detailed embodiment of tamper-proof electronic package 200, and in particular, of multilayer circuit board 210, to which glass enclosure 220 is secured. In this configuration, the embedded tamper-respondent sensor includes multiple tamper-respondent layers including, by way of example, at least one tamper-respondent mat (or base) layer 300, and at least one tamper-respondent frame 301. In the example depicted, two tamper-respondent mat layers 300 and two tamper-respondent frame 301 are illustrated, by way of example only. The lower-most tamper-respondent mat layer 300 may be a continuous sense or detect layer extending completely below the secure volume being defined within and/or above multilayer circuit board 210. One or both tamper-respondent mat layers 300 below secure volume 201 may be partitioned into multiple circuit zones. Within each tamper-respondent mat layer, or more particularly, within each circuit zone of each tamper-respondent mat layer, multiple circuits or conductive traces may be provided in any desired configuration. Further, the conductive traces within the tamper-respondent layers may be implemented as, for instance, a resistive layer.

As illustrated, one or more external signal lines or planes 305 may enter secure volume 201 between, in one embodiment, two tamper-respondent mat layers 300, and then electrically connect upwards into the secure volume 201 through one or more conductive vias, arranged in any desired location and pattern. In the configuration depicted, the one or more tamper-respondent frames 301 are disposed at least inside of the area defined by continuous groove 212 accommodating the base of glass enclosure 220. Together with the tamper-respondent detector associated with glass enclosure 220, tamper-respondent frames 301, and tamper-respondent mat layers 300, define secure volume 201, which extends, in part, into multilayer circuit board 210. With secure volume 201 defined, in part, within multilayer circuit board 210, the external signal line(s) 305 may be securely electrically connected to, for instance, the one or more electronic components mounted to, or of, multilayer circuit board 210 within secure volume 201. In addition, secure volume 201 may accommodate electrical interconnection of the conductive traces of the multiple tamper-respondent layers 300, 301, for instance, via appropriate monitor circuitry.

Added security may be provided by extending tamper-respondent mat layers 300 (and if desired, tamper-respondent frames 301) outward past the periphery of glass enclosure 220. In this manner, a line of attack may be made more difficult at the interface between glass enclosure 220 and multilayer circuit board 210 since the attack would need to clear, for instance, tamper-respondent mat layers 300, the glass enclosure 220, as well as the tamper-respondent frames 301 of the embedded tamper-respondent sensor.

Numerous variations on multilayer circuit board 210 of FIGS. 2A-2B are possible. For instance, in one embodiment, the embedded tamper-respondent sensor may include one or more tamper-respondent mat layers 300 and one or more tamper-respondent frames 301, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, would be facilitated.

Note also that, once within the secure volume is defined in part within multilayer circuit board 210, conductive vias within the secure volume between layers of multilayer circuit board 210 may be either aligned, or offset, as desired, dependent upon the implementation. Alignment of conductive vias may facilitate, for instance, providing a shortest connection path, while offsetting conductive vias between layers may further enhance security of the tamper-proof electronic package by making an attack into the secure volume through or around one or more tamper-respondent layers of the multiple tamper-respondent layers more difficult.

The tamper-respondent layers of the embedded tamper-respondent sensor formed within the multilayer circuit board of the electronic circuit or electronic package may include multiple conductive traces or lines formed between, for instance, respective sets of input and output contacts or vias at the trace termination points. Any pattern and any number of conductive traces or circuits may be employed in defining a tamper-respondent layer or a tamper-respondent circuit zone within a tamper-respondent layer. For instance, 4, 6, 8, etc., conductive traces may be formed in parallel (or otherwise) within a given tamper-respondent layer or circuit zone between the respective sets of input and output contacts to those conductive traces.

Figure 4:
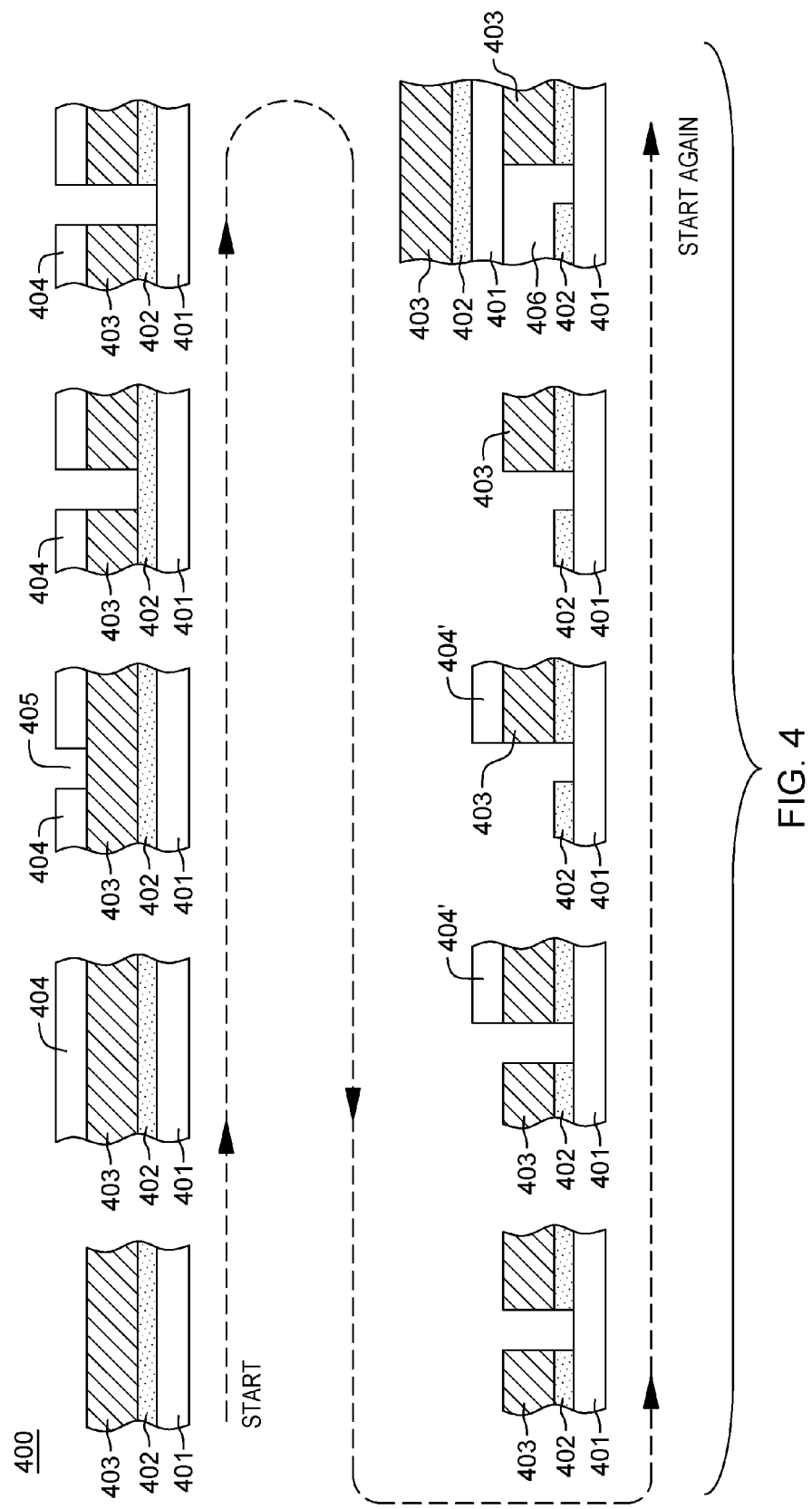
FIG. 4 depicts one embodiment of a process of fabricating a multilayer circuit board with an embedded tamper-respondent sensor, in accordance with one or more aspects of the present invention.

In one or more implementations, the multilayer circuit board may be a multilayer wiring board or printed circuit board formed, for instance, by building up the multiple layers of the board. FIG. 4 illustrates one embodiment for forming and patterning a tamper-respondent layer within such a multilayer circuit board.

As illustrated in FIG. 4, in one or more implementations, a tamper-respondent layer, such as a tamper-respondent mat layer or a tamper-respondent frame disclosed herein, may be formed by providing a material stack comprising, at least in part, a structural layer 401, such as a pre-preg (or pre-impregnated) material layer, a trace material layer 402 for use in defining the desired trace patterns, and an overlying conductive material layer 403, to be patterned to define conductive contacts or vias electrically connecting to the pattern of traces being formed within the trace material layer 402, for instance, at trace terminal points. In one or more implementations, the trace material layer 402 may comprise nickel phosphorous (NiP), and the overlying conductive layer 403 may comprise copper. Note that these materials are identified by way of example only, and that other trace and/or conductive materials may be used within the build-up 400.

A first photoresist 404 is provided over build-up 400, and patterned with one or more openings 405, through which the overlying conductive layer 403 may be etched. Depending on the materials employed, and the etch processes used, a second etch process may be desired to remove portions of trace material layer 402 to define the conductive traces of the subject tamper-respondent layer. First photoresist 404 may then be removed, and a second photoresist 404' is provided over the conductive layer 403 features to remain, such as the input and output contacts. Exposed portions of conductive layer 403 are then etched, and the second photoresist 404' may be removed, with any opening in the layer being filled, for instance, with an adhesive (or pre-preg) and a next build-up layer is provided, as shown. Note that in this implementation, most of overlying conductive layer 403 is etched away, with only the conductive contacts or vias remaining where desired, for instance, at the terminal points of the traces formed within the layer by the patterning of the trace material layer 402. Note that any of a variety of materials may be employed to form the conductive lines or traces within a tamper-respondent layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which could be employed include OhmegaPly®, offered by Ohmega Technologies, Inc., of Culver City, Calif. (USA), or Ticer™, offered by Ticer Technologies of Chandler, Ariz. (USA).

The trace lines or circuits within the tamper-respondent layers, and in particular, the tamper-respondent circuit zones, of the embedded tamper-respondent sensor, along with the tamper-respondent detector monitoring the glass enclosure, may be electrically connected to monitor or compare circuitry provided, for instance, within secure volume 201 (FIG. 2A) of the tamper-proof electronic package. The monitor circuitry may include various bridge or compare circuits, and conventional printed wiring board electrical interconnect inside secure volume 201 (FIG. 2A), for instance, located within the secure volume defined by the tamper-respondent frames 301 (FIG. 3), and the tamper-respondent mat layers 300 (FIG. 3).

Note that advantageously, different tamper-respondent circuit zones on different tamper-respondent layers may be electrically interconnected into, for instance, the same comparator circuit, Wheatstone bridge, or similar monitor circuitry. Thus, any of a large number of interconnect configurations may be possible. For instance, if each of two tamper-respondent mat layers contains 30 tamper-respondent circuit zones, and each of two tamper-respondent frames contains 4 tamper-respondent circuit zones, then, for instance, the resultant 68 tamper-respondent circuit zones may be connected in any configuration within the secure volume to create the desired arrangement of circuit networks within the secure volume being monitored for changes in resistance or tampering. Note in this regard, that the power supply or battery for the tamper-respondent sensor may be located external to the secure volume, with the sensor being configured to trip and destroy any protected or critical data if the power supply or battery is tampered with.

As briefly noted, in one or more implementations, the tamper-proof electronic packages disclosed herein may include (at least in part) stressed glass enclosure protection of the one or more electronic components. The secure volume, for instance, secure volume 201 (FIG. 2A) may be defined in part by glass enclosure 220, as well as a tamper-respondent detector monitoring, the glass enclosure. The glass enclosure may be fabricated of stressed glass, such that the stressed glass fragments (at least in part) with an attempted intrusion event into the secure volume such as, for instance, a mechanical or chemical attack through the stressed glass. The tamper-respondent detector detects the fragmentation of the stressed glass, and thus the tamper intrusion event. Once tampering is detected, the monitor circuitry may activate an erase circuit to erase information stored within, for instance, associated memory, as well as any encryption and/or decryption module within the secure volume. More generally, monitor circuitry could activate an erase circuit to erase any confidential information stored within the secure volume.

In one or more implementations, the glass enclosure may comprise a highly stressed glass enclosure with a compressively-stressed surface layer. For instance, the glass enclosure may comprise a machined glass or molded (or cast) glass stressed using an ion exchange process, referred to herein as ion exchanged glass. Note also in this regard, that the stressed glass may be any friable glass or friable glass ceramic, with stressed glass being used herein as inclusive of a stressed glass ceramic. In one or more embodiments, the compressively-stressed surface layer(s) may be compressively-stressed or tailored so that the stress glass fragments into, for instance, glass particles less than 1000 μm in size, such as in a range of 100-1000 μm in size, with an attempted tamper intrusion event through the stressed glass. The fragmentation size of the glass particles may be tailored to ensure that the tamper-respondent detector monitoring the glass enclosure senses the tamper intrusion event. For instance, the tamper-respondent detector may monitor structural integrity of the stressed glass via a sensor associated with the stressed glass, and the fragmentation size of the glass particles should be sufficient to, for instance, break the sensor, and thereby signal the tamper event.

In one or more embodiments, the stressed glass of the glass enclosure may be coated to provide, in part, opaqueness to the glass enclosure. For instance, one or more surfaces of the stressed glass, after undergoing processing to stress the surfaces, may be coated to provide opaqueness to the glass enclosure. Alternatively, the glass enclosure, such as the compressively-stressed surface layer(s) of the enclosure, may be partially etched, for instance, after undergoing processing to stress the surface(s), thereby providing opaqueness to the glass enclosure.

The stressed glass may be, in one or more embodiments, a monolithic glass element configured to enclose, at least in part, the at least one electronic component within the secure volume. For instance, a machined or molded, monolithic glass element could be formed to define a multi-sided glass structure, such as a five-sided glass enclosure. The multi-sided glass structure could then be treated to compressively stress the surfaces of the glass. For instance, ion-exchange processing could be employed to provide a desired degree of compressive stressing on the surfaces or surface layers of the monolithic glass element. In this manner, the monolithic glass element is formed that comprises stressed glass which defines multiple sides of the secure volume. In another embodiment, the glass enclosure could comprise a plurality of stressed glass elements adhesively bonded together to form the glass enclosure, such as a multi-sided glass enclosure. Each stressed glass element may comprise a respective, compressively-stressed surface layer or layers. For instance, with an ion-exchange process, any exposed surface of a glass element may be treated to create the respective, compressively-stressed surface layer(s) of the stressed glass element.

As noted, in one or more embodiments, the tamper-respondent detector monitors structural integrity of the stressed glass via one or more sensors associated with the stressed glass of the glass enclosure. For instance, the one or more sensors may comprise at least one conductor attached to or coating an inner surface of the stressed glass within the secure volume. The at least one conductor may be sized, designed or configured to fragment with fragmentation of the stressed glass, thereby, for instance, open-circuiting the sensor and allowing monitor circuitry of or associated with the detector to detect the tamper intrusion event. By way of example, the sensor(s) may comprise a thin conductive coating or a conductive trace on one or more inner surfaces of the stressed glass. Alternatively, the sensor(s) may monitor a capacitance or inductance of the stressed glass in monitoring structural integrity of the glass enclosure. In one or more other embodiments, the sensor(s) may monitor optical reflectance of the stressed glass or utilize the stressed glass as a waveguide in monitoring structural integrity of the glass enclosure. In such cases, one or more reflective coatings may be provided on or in association with the stressed glass of the glass enclosure to facilitate reflectance of an optical signal between, for instance, an optical emitter and one or more optical receivers disposed within the secure volume of the tamper-proof electronic package.

In one or more other implementations, the glass enclosure may be an upper glass enclosure, and the tamper-proof electronic package may also include a base glass enclosure, with the upper glass enclosure and the base glass enclosure being adhesively secured together (or to opposite sides of a circuit board), via, for instance, structural adhesive, to define the secure volume accommodating the at least one electronic component. In one or more embodiments, the base glass enclosure may also comprise stressed glass, with one or more compressively-stressed surface layers as described herein. In such embodiments, the electronic component(s) to be protected within the secure volume may be substantially 360° surrounded by a stressed glass assembly.

Note that in one or more embodiments, responsive to detecting an attempted intrusion event through the stressed glass, the tamper-respondent detector, which comprises the monitor circuitry within the secure volume, may signal an erase circuit to erase any confidential information within the secure volume, such as a variable key of an encryption and/or decryption module, or other security sensitive information disposed within the secure volume. This erasure of information would occur automatically and commensurate with, for instance, fragmentation of the stressed glass due to an intrusion event.

Before describing further exemplary tamper-proof electronic packages in accordance with one or more aspects of the present invention, stressed glass materials and processings are discussed below.

Highly-stressed glass has been known to fragment into small pieces. There are several ways to create highly-stressed glass. For example, tempered glass is a type of highly-stressed glass that is made using thermal treatments. Tempering the glass puts the outer surfaces of the glass into compression, and the inner portion of the glass into tension.

Another way to create highly-stressed glass is using chemical treatments, such as an ion-exchange process. A commonly used ion-exchange process for soda lime glass is a potassium and sodium (K/Na) ion-exchange process. Unstressed glass is submerged in a bath containing a potassium salt, typically potassium nitrate (KNO3), at an elevated temperature. The sodium ions at the surface of the glass are replaced by potassium ions from the potassium nitrate. Because the potassium ions are roughly 30% larger than the sodium ions, the surface of the glass is put into a compressive state. The surface compression is balanced by residual internal tensile stresses. The ion-exchange depth and the number of sodium ions replaced by potassium ions determines the compressive layer depth and the magnitudes of the compressive and tensile stresses. The ion-exchanged depth is a diffusion-controlled process, modulated by time and temperature.

In material science, there has recently been work in controlling fragmentation characteristics of chemically strengthened glass.

The basic mechanism by which stressed glass fragmentation occurs has only recently been understood using the framework of fracture mechanics. The fragmentation phenomenon relies on glass having an interior region in a highly tensile state contained within an exterior that is compressively-stressed. If a flaw is introduced into the tensile region of the glass, the glass experiences a large mode I crack driving force due to the release of strain energy from the stressed region. The high-strain energy release rate causes a tensile crack to advance through the glass at speeds approaching the speed of sound. As the crack propagates through the glass, it bifurcates due to the interaction between the stress field in front of the crack and stress waves. The more often the crack bifurcates, the smaller the fragments will be.

The crack propagation may have two components. The crack may tunnel through the bulk of the material, and the crack may travel towards the surface of the material. For chemically strengthened glass, the crack front tunneling through the bulk of the material experiences a high, and mostly constant, crack driving force through the tensile region of the substrate. This allows it to propagate at a relatively steady velocity, close to the speed of sound, and allows it to branch and create a network of cracks in the tensile region of the substrate.

As used herein, the "fragmentation size" is a fragmentation characteristic pertaining to the width of the fragments of the glass substrate upon fracturing. The fragmentation size may be the average of the largest linear widths of the fragments created by the fracturing of the glass substrate. For example, a rectangular fragment of glass with a first edge 250 microns wide, and a second edge 100 microns wide, will have a fragment width of roughly 269 microns, because that is the largest distance across a surface of the glass substrate, in this case, from corner to opposite corner. Fragmentation characteristics of chemically strengthened glass can be controlled by altering the glass's stress field. By altering the stress field within the glass, the frequency of the crack bifurcation may be increased to cause the glass to fragment into smaller pieces. In particular, fragmentation size is determined by the ratio of the compressive layer (CL) stress to the tensile layer (TL) stress. There are certain constraints to this characterization when the compressive layer becomes too thick. To solve that issue, larger ions, such as rubidium (Rb) may be used, along with thinner compressive layers formed, for instance, via shorter, higher-temperature anneals.

A "stress field" describes the magnitude and type of stress (e.g., compressive, tensile) through a body, or through a region of a body. An "inhomogeneous stress field" is a stress field where the stresses within a material are not uniform. For example, a chemically strengthened glass substrate may have surfaces in compression, while the bulk of the material is in tension. The stress field for the chemically strengthened glass substrate may be considered inhomogeneous because the stresses through the glass substrate are not the same.

By way of detailed example, studies of ion-exchange glass substrates have mapped out the crack branch and behavior in certain commercially available glass substrates. The results show the dimension (x) of the glass fragments according to the following empirical relationship:

$$x = \frac{K_{IC}^2}{\sigma_t^2}(1+v)\frac{t}{(0.5t-\delta)} \tag{1}$$

Where: x=fragment size,
$K_{Ic}$=toughness,
$\sigma_t$=tensile stress in the glass (the higher the tensile stress, the larger the driving force),
t=thickness,
v=Poisson's ration (which is a constant for a given glass composition, and is a measure of how much the glass part expands (in compression) or contracts (in tension)), and
δ=ion exchange depth.

Based on this relationship, it would be expected that for a given substrate thickness, the fragment size should principally decrease with an increased ion exchange depth, and hence an increased ion exchange time. That is, fragmentation or particle size will decrease with higher tensile stress in the middle of the stressed glass layer, and a decreased glass thickness. Thus, in implementation, a balance needs to be obtained between making the glass substrate too thin such that the middle tensile layer becomes vanishing thin as well.

By way of example, an ion exchange process may be developed to achieve a desired glass fragmentation size using, for instance, a tube furnace with a quartz tube and a PID controller. A stainless steel boat in the tube may be used to carry out the ion exchange. Glass plates may be placed in salt melt in the boat during processing. If desired, a stainless steel basket may be used inside the stainless steel boat to handle very fragile thin glass plates.

The glass plates employed in forming the glass enclosure may be, for instance, aluminosilicates available from Abrisa Technology, Inc. of Santa Paula, Calif., USA. The glass plates may have a variety of thicknesses. For instance, glass substrate thicknesses in a range of 0.5 mm to 3 mm might be employed in forming the glass enclosure. Additional grinding and polishing may be carried out on untreated glass to reduce the thickness of the glass if a very thin glass substrate is desired for a particular application. By way of further example, machineable aluminosilicate glass may be obtained from Corning Glass through Swift Glass Company of Elmira, N.Y., USA.

By way of specific example, in one or more embodiments, the glass enclosures described herein could comprise High Ion Exchange (HIE™), chemically strengthened glass, provided by Abrisa Technologies, of Santa Palo, Calif., USA. HIE™ glass is a thin, lightweight, aluminosilicate glass that is used in certain applications to achieve greater scratch, impact, and shock resistance.

Note also that, the glass enclosures described herein may have a final wall thickness in the range of, for instance, 0.1-0.8 mm (100 to 800 μm) of an ion-exchangeable glass substrate, where the glass substrate has been machined to its final dimensions, including rounded corners, prior to ion-exchanging in a suitable bath to allow for the compressive layer to be formed to an optimum thickness for a particular application, leaving a highly-tensile stressed core in the center of the glass. Final, fragmented particle size can be in a large range, provided that the fragmentation size is small enough to break the one or more sensors of the tamper-respondent detector sufficiently to disable the sensor and thereby signal a tamper intrusion event. This range could be, for instance, 100-1000 μm.

FIGS. 5-8D depict further exemplary tamper-proof electronic packages, in accordance with one or more aspects of the present invention. As described below, in each implementation, a glass enclosure comprising stressed glass is employed along with a tamper-respondent detector to detect fragmenting of the glass enclosure with an attempted intrusion event through the stressed glass. As described herein, with detecting fragmenting of a stressed glass enclosure, an erase circuit may be activated to erase confidential information stored within the secure memory.

Figure 5:
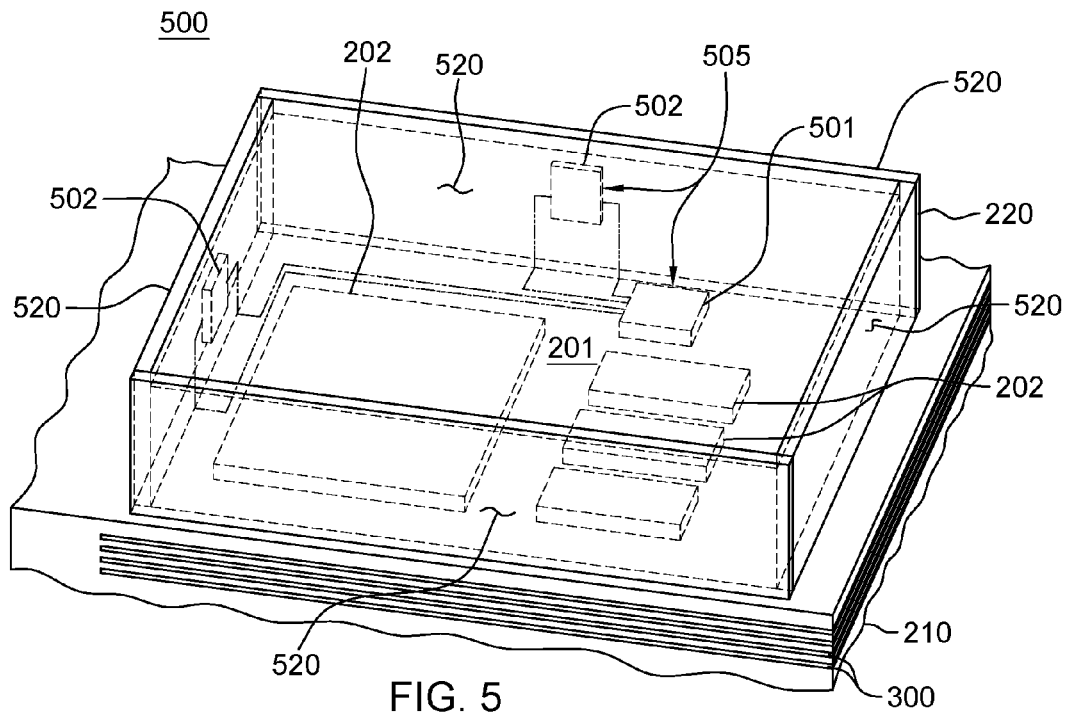
FIG. 5 depicts one embodiment of a tamper-proof electronic package, or tamper-respondent assembly, which includes (in part) a glass enclosure formed of stressed glass, and a tamper-respondent detector, in accordance with one or more aspects of the present invention.

Referring to FIG. 5, a tamper-proof electronic package 500 is depicted which comprises, by way of example, a glass enclosure 220 formed of a plurality of stressed glass elements 520 adhesively bonded together. In this example, each stressed glass element 520 includes one or more respective, compressively-stressed surface layers, and together the plurality of stressed glass elements 520 define multiple sides of secure volume 201. Stressed glass elements 520 may be adhesively secured together using, for instance, the same structural adhesive used in securing glass enclosure 220 to, for instance, multilayer circuit board 210. As one example, the structural adhesive may be, for instance, Henkel Loctite Hysol EA 9360 AERO epoxy adhesive, which adheres well to glass surfaces. As described above, multi-layer circuit board 210 may comprise multiple embedded tamper-respondent sensors 300 within the circuit board. Fabrication of multilayer circuit board 210 and provision of embedded tamper-respondent sensors may be as described above in connection with FIGS. 2A-4.

In the embodiment of FIG. 5, a tamper-respondent detector 505 is provided comprising monitor circuitry 501 and multiple sensors 502. Each sensor 502 is associated with a respective stressed glass element 520, with only two sensors 502 being depicted in FIG. 5 for clarity. Conductive lines may be provided coupling each sensor 502 to monitor circuitry 501. Sensors 502 may be designed or configured to ensure fragmenting of the sensor with fragmenting of the attached stressed glass element 520.

In one or more implementations, each stressed glass element comprises, for instance, ion-exchange glass formed as described above. When the glass elements are assembled and adhesively secured together as depicted in FIG. 5, they form glass enclosure 220 enclosing the at least one electronic component, such as electronic devices or elements 202 within secure volume 201 of tamper-proof electronic package 500. The sensors 502 may be formed as conductive or resistive elements, of any desired material, and (in one or more embodiments) be sufficiently thin to fragment with fragmenting of the attached stressed glass element 520. Monitor circuitry 501 may comprise or be coupled to an erase circuit which automatically erases confidential information stored within secure volume 201 with fragmenting of one or more of the stressed glass elements 520.

Note with respect to tamper-proof electronic package 500 of FIG. 5, that glass enclosure 220 may be bonded to an upper surface of multilayered circuit board 210 without, for instance, residing within a continuous groove such as that described above in connection with the embodiment of FIGS. 2A-3. The structural adhesive noted above bonds tenaciously to both the glass and the multilayer circuit board, and advantageously results in the glass fracturing or the multilayer circuit board tearing upon an attempt to breach the enclosure through the structural adhesive. Note that in one or more implementations, depending upon the fragmentation process, or stressed glass elements used, fewer sensors 502 may be employed in association with glass enclosure 220. For instance, it may be possible for fragmentation of one stressed glass element 520 to be propagated to the other stressed glass elements 520 across the structural adhesive. Further, although depicted as assembled from five distinct stressed glass elements 520, less than five stress glass elements may be employed to form glass enclosure 220. For instance, two L-shaped glass elements could be brought together and adhesively secured, along with a top side glass element to produce the multi-sided glass enclosure depicted in FIG. 5. Note also that the shape and size of sensors 502 may vary depending on the implementation. For instance, each sensor 502 could comprise one or more conductive lines, traces or coatings covering a portion or substantially all of the inner surface of the respective stressed glass element 520 within secure volume 201. Further, any desired material could be employed in forming sensor 502 or the conductive lines coupling each sensor 502 to monitor circuitry 501 of the tamper-respondent detector 505.

Figure 6:
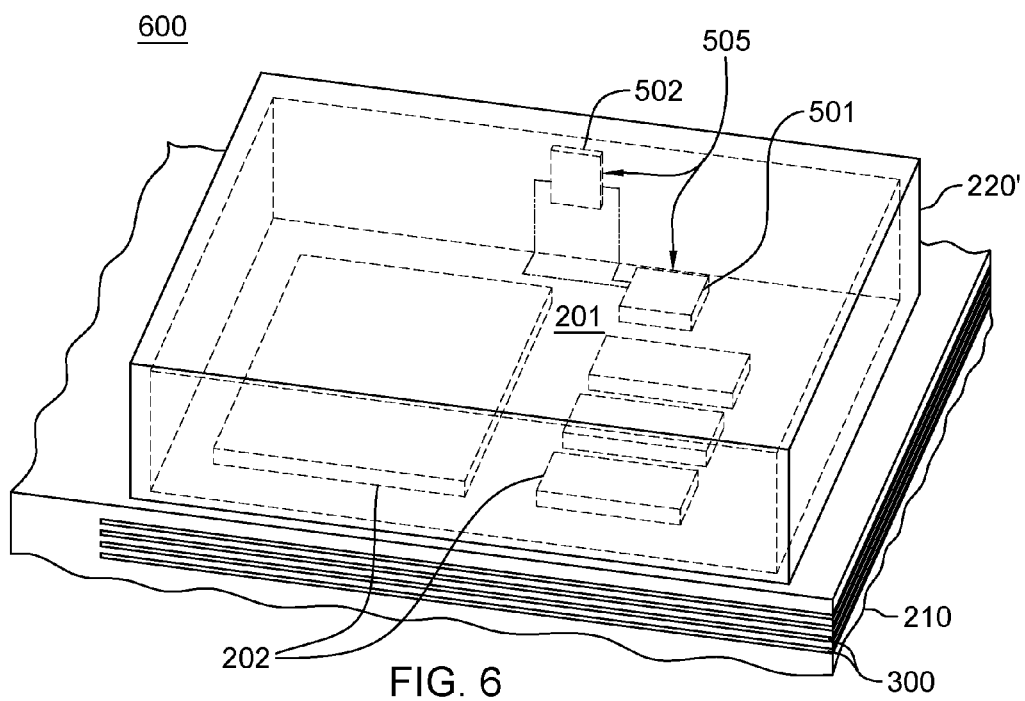
FIG. 6 depicts another embodiment of a tamper-proof electronic package, which includes (in part) a glass enclosure formed of stressed glass and a tamper-respondent detector, in accordance with one or more aspects of the present invention.

FIG. 6 depicts an alternate embodiment of a tamper-proof electronic package 600, in accordance with one or more aspects of the present invention. In this embodiment, a glass enclosure 220' is provided and, for instance, adhesively secured to an upper surface of multilayer circuit board 210. Multilayer circuit board 210 again includes embedded tamper-respondent sensors 300 such as described above, and one or more electronic components, such as electronic devices or elements 202 are disposed within the defined secure volume 201 of tamper-proof electronic package 600.

In this embodiment, glass enclosure 220' is a monolithic glass element comprising a multi-sided glass structure defining multiple sides of secure volume 201. In this monolithic example, fewer sensors 502 may be employed by the tamper-respondent detector 505 to monitor for fragmentation of glass enclosure 220' since fragmentation of the entire element would occur upon any attempt to penetrate the stressed glass from any direction, whether mechanically or chemically attacking the stressed glass, thereby triggering detection of the tamper event by the monitor circuitry 501. By way of example, a monolithic glass element such as depicted in FIG. 6 could be molded (or cast) in the desired shape, or formed from a single block of glass hollowed out, for instance, by etching or other machining methods, to create a cavity that allows for the glass enclosure to accommodate the one or more electronic components to be protected within secure volume 201 between glass enclosure 220' and multilayer circuit board 210.

Note that in both the multiple stressed glass elements embodiment of FIG. 5 and the monolithic glass element embodiment of FIG. 6, thickness of the stressed glass may be tailored to a desired substrate size for a particular application and a particular desired fragmentation size of fragmented glass pieces resulting from an attempted intrusion event. Additionally, opacity of the glass enclosure may be provided to, for instance, prevent an intruder from having visibility into the secure volume of the tamper-proof electronic package. Possible coatings of the glass enclosure could include InSnOxide or a metal or metal alloy coating, such as aluminum, or an aluminum alloy. Alternatively, the glass enclosure, and more particularly, the stressed glass element(s) of the glass enclosure could be mildly etched (for instance, after ion-exchange processing of the glass) to make the glass enclosure opaque. Further, opacity may be provided in combination with any of the tamper-proof electronic packages discussed herein.

Figure 7:
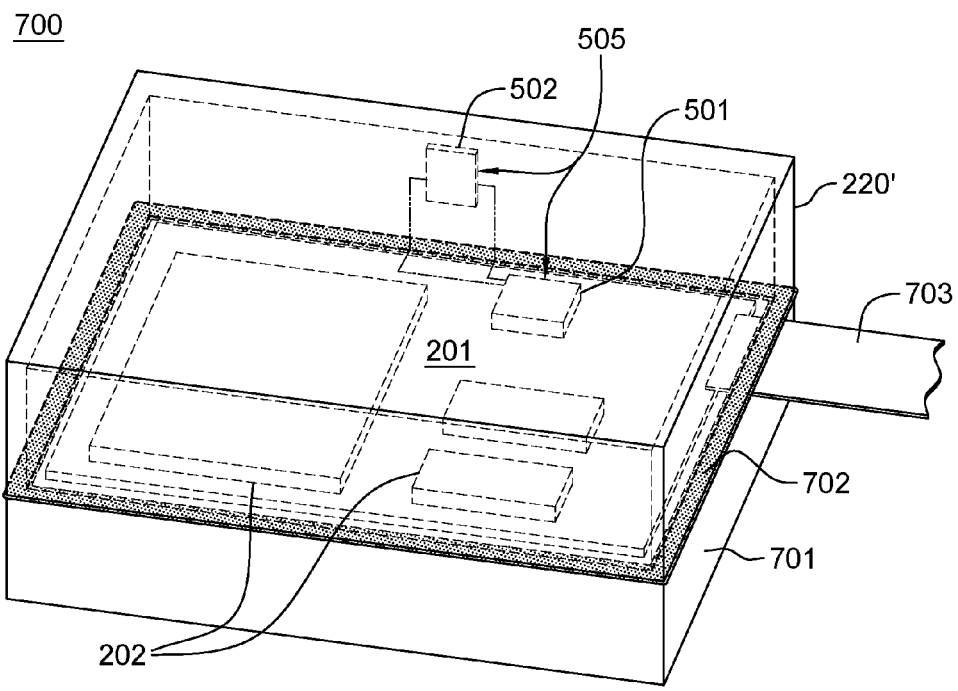
FIG. 7 depicts a further embodiment of a tamper-proof electronic package, which includes (in part) a glass enclosure assembly substantially fully enclosing one or more electronic components (such as a circuit board or card) to be protected, in accordance with one or more aspects of the present invention.
Figure 8A:
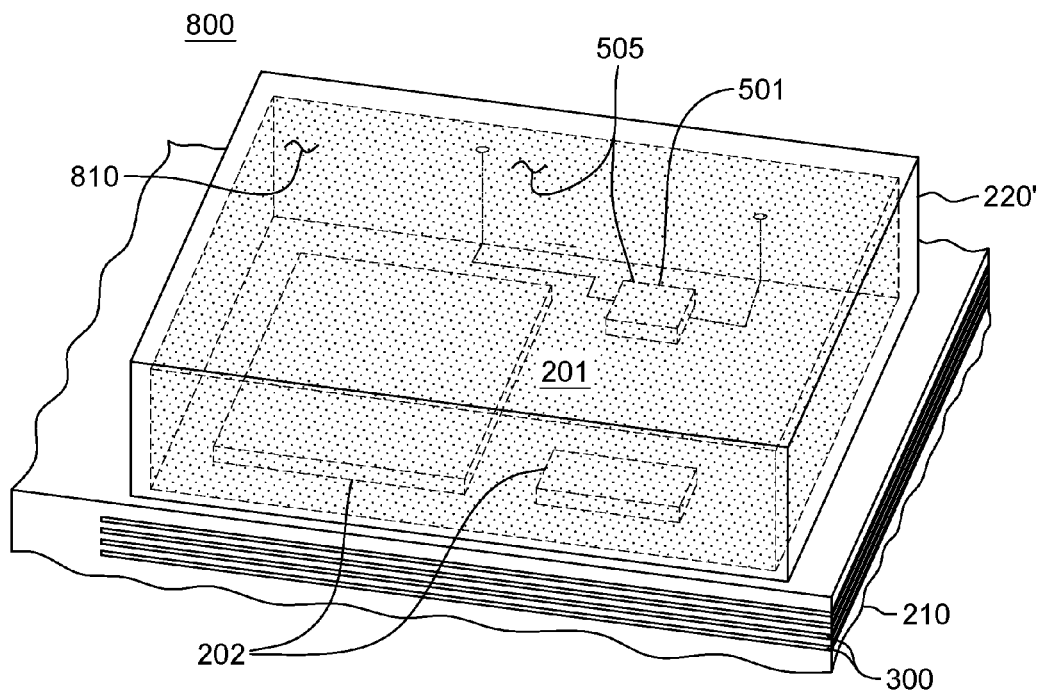
FIG. 8A depicts another embodiment of a tamper-proof electronic package comprising (in part) a glass enclosure formed of stressed glass and a tamper-respondent detector, in accordance with one or more aspects of the present invention.
Figure 8B:
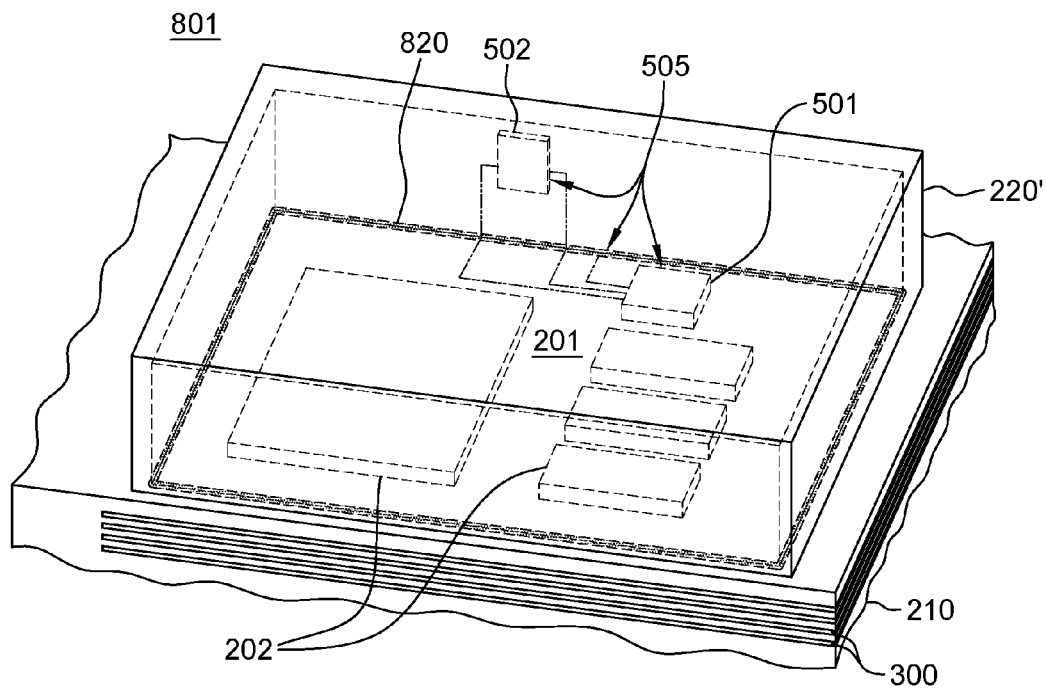
FIG. 8B depicts a further embodiment of a tamper-proof electronic package including (in part) a glass enclosure formed of stressed glass and a tamper-respondent detector, in accordance with one or more aspects of the present invention.
Figure 8C:
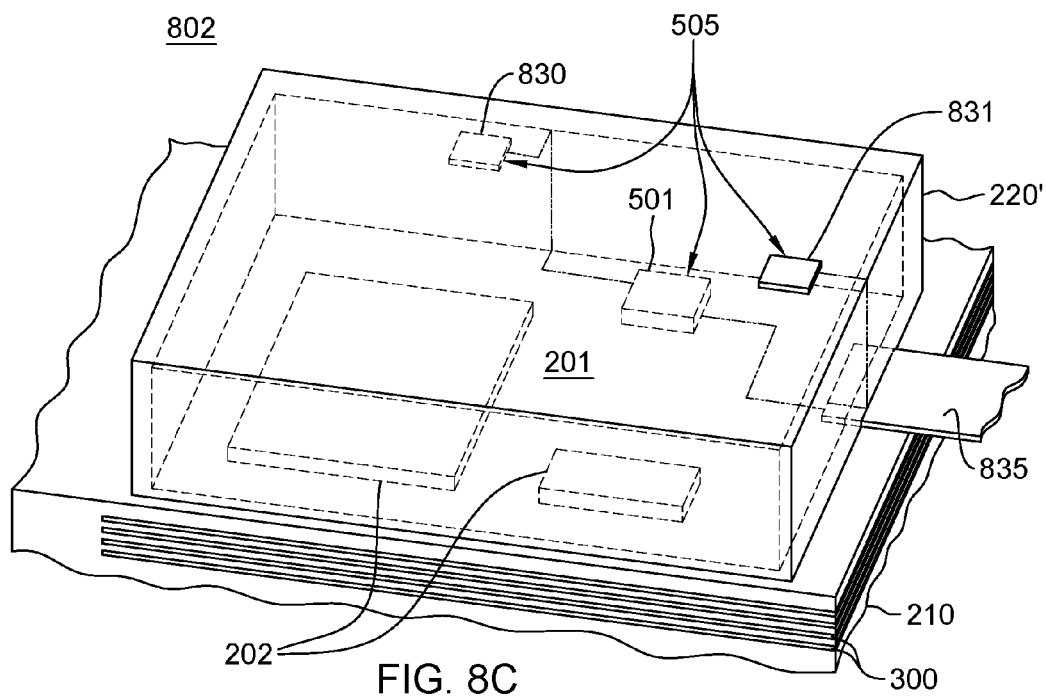
FIG. 8C is another embodiment of a tamper-proof electronic package comprising (in part) a glass enclosure formed of stressed glass and a tamper-respondent detector, in accordance with one or more aspects of the present invention.
Figure 8D:
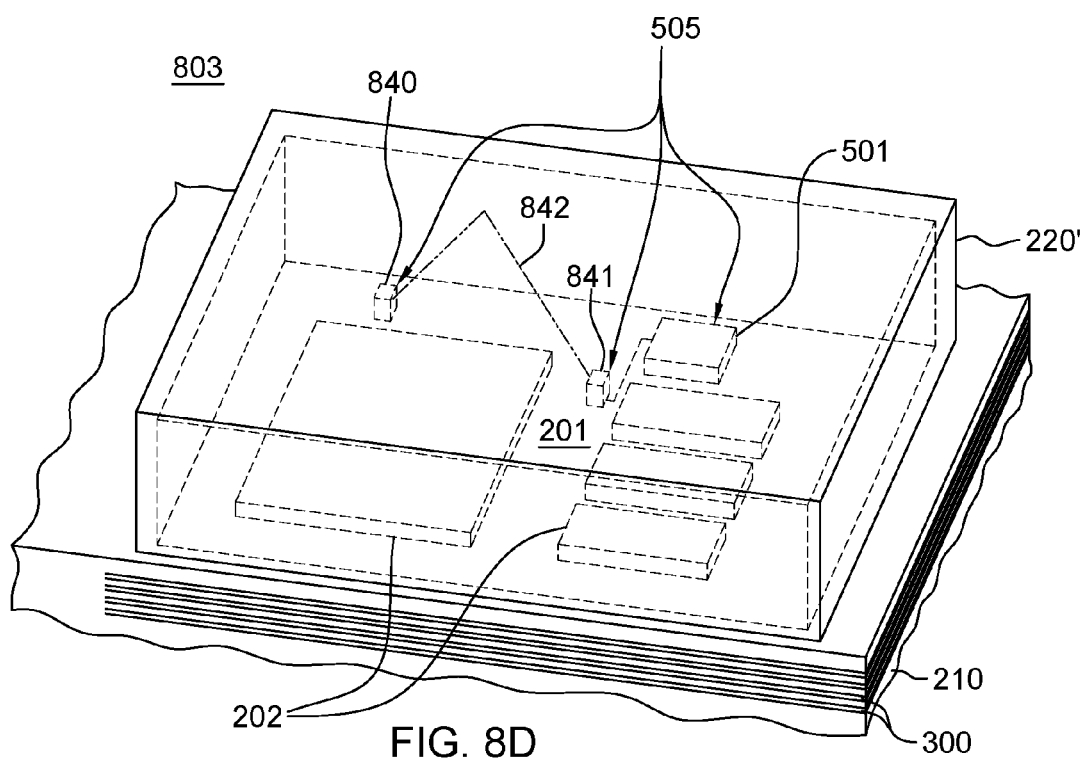
FIG. 8D depicts a further embodiment of a tamper-proof electronic package comprising (in part) a glass enclosure formed of stressed glass and an optical tamper-respondent detector, in accordance with one or more aspects of the present invention.

By way of example, FIG. 7-8D depict various alternate implementations of a tamper-proof electronic package. In each implementation depicted, glass enclosure 220' is assumed to comprise a monolithic glass element, by way of example only. In other implementations, multiple stressed glass elements may be adhesively secured together to form the glass enclosure, such as described above in connection with FIG. 5. As noted, with a monolithic implementation, tamper-respondent detector 505 may include monitor circuitry 501 and a single sensor 502 associated with the monolithic glass element. In one or more other implementations, multiple sensors 502 could be provided in association with the stressed glass element, for instance, on the same glass face or surface, or on different glass faces of the element.

Referring to FIG. 7, another embodiment of tamper-proof electronic package 700 is shown, in accordance with one or more aspects of the present invention. In this embodiment, the multilayer circuit board 210 of FIGS. 5 & 6 is replaced by, for instance, a base glass enclosure 701 structurally adhesively bonded 702 to glass enclosure 220', which in this assembly is an upper glass enclosure. Together, the upper and lower glass enclosures 220', 701 substantially form a 360-degree glass enclosure about secure volume 201, accommodating the electronic components to be protected. Base glass enclosure 701 may also comprise stressed glass, with one or more compressively-stressed surface layers, such as described herein. Note that the thickness of the upper and lower glass enclosures 220', 701 may be the same or different. The tamper-respondent detector 505 includes monitor circuitry 501 and multiple sensors 502, with one sensor 502 being associated with upper glass enclosure 220', and in one or more embodiments, another sensor (not shown) being associated with base glass enclosures 701, such that an attempted intrusion event through any portion of the tamper-proof electronic package results in fragmentation of at least the corresponding upper or base glass enclosure, and thereby detection of the tamper event to allow for one or more actions to be taken to protect any confidential information within secure volume 201.

Note that in addition to structural adhesive 702, tamper-proof electronic package 700 may include one or more sensors such as exposed conductive lines or traces on one or both of the upper and base glass enclosures, for instance, where joined via the adhesive 702. Thus, any pulling apart of the adhesive would necessarily result in damage to the conductive trace(s) at the interface, and thereby, detection of an attempted intrusion event through the adhesive. Further, any of the tamper-proof electronic packages disclosed herein could similarly employ one or more conductive traces at the interface between, for instance, the glass enclosure and the multilayer circuit board to further protect the interface between the two structures against an undetected tamper event.

In the example of FIG. 7, electrical signals may be provided into or from the secure volume via one or more signal lines 703 extending through, for instance, specially configured exit portals of base glass enclosure 701. For instance, in one or more implementations, Z-shaped or other angled channels could be formed in base enclosure 701 through which electrical signal lines 703 may pass. The angled channels are formed to provide a mechanically secure egress and ingress of electrical signal lines 703 from and to secure volume 201.

FIG. 8A depicts another embodiment of a tamper-proof electronic package 800, in accordance with one or more aspects of the present invention. This tamper-proof electronic package 800 is similar to that described above in connection with FIG. 6. For instance, the tamper-proof electronic package 800 includes a glass enclosure 220' which, in one or more implementations, is a monolithic glass element that is structurally adhesively secured to multilayer circuit board 210 having embedded tamper-respondent sensors 300 disposed therein. Secure volume 201 is defined by glass enclosure 220' for accommodating one or more electronic components, such as electronic devices or elements 202. In this embodiment, tamper-respondent detector 505 includes monitor circuitry 501 and a sensor coating 810*m* which is provided on the inner surface of the monolithic glass element defining secure volume 201. This sensor coating 810 may be, for instance, a conductive coating, such as a metal or metal alloy coating, and the detector 505 may include conductive traces or lines to multiple locations of the conductive coating 810 to electrically connect to and monitor the conductive coating, and thus the monolithic glass element, for fragmentation. Note in this regard that the coating may be sufficiently thin, such as 1000 Angstroms or less, so that should the stressed glass substrate of glass enclosure 220' fragment due to an attempted tamper event, the coating will also fragment with the glass pieces. Note also that as in the other embodiments described herein, the glass enclosure 220' comprises stressed glass having one or more compressively-stressed surface layers. For instance, in one or more embodiments, both the inner surface and the outer surface of the monolithic glass element may be compressively-stressed.

FIG. 8B depicts another tamper-proof electronic package 801 similar to that described in connection with FIG. 6, but with the addition of one or more sensor lines 820 at the interface between glass enclosure 220' and multilayer circuit board 210. As discussed above, these sensor lines 820 may be exposed conductive lines or traces on one or both sides of glass enclosure 220', for instance, about the periphery of the glass enclosure, between or adjacent to the interface of glass enclosure 220' and multilayer circuit board 210. In one or more implementations, sensor lines 820 would be covered by the structural adhesive securing glass enclosure 220' to multilayer circuit board 210. Therefore, an attempted mechanical or chemical attack at the adhesive would necessarily result in damage to the conductive trace(s) 820 at the interface, and thereby detection of the attempted intrusion event through the adhesive.

As illustrated in FIG. 8B, tamper-respondent detector 505 may include one or more conductive lines connecting monitor circuitry 501 to sensor line(s) 820, as well as conductive lines coupling one or more sensors 502 to monitor circuitry 501. As noted, in one or more implementations, glass enclosure 220' may be a monolithic glass element that is structurally, adhesively secured to multilayer circuit board 210, which has embedded tamper-respondent sensors 300 disposed therein. Together, the tamper-respondent detector 505 and the embedded tamper-respondent sensors 300, which may also be electrically connected to monitor circuitry 501, facilitate defining secure volume 201 accommodating the one or more electronic components, such as electronic devices or elements 202, to be protected.

FIGS. 8C & 8D depict tamper-proof electronic packages 802, 803, respectively, with alternate embodiments of tamper-respondent detectors 505. These tamper-proof electronic packages 802, 803 of FIGS. 8C & 8D are similar to the tamper-proof electronic package described above in connection with FIG. 6.

Referring to FIG. 8C, a tamper-respondent detector 505 is illustrated comprising monitor circuitry 501 and multiple conductive contacts or plates 830, 831. The conductive contacts or plates 830, 831 may be disposed in various locations on the monolithic glass element of glass enclosure 220'. By way of example, conductive contact or plate 830 may be located on an inner surface of the monolithic glass element, and conductive contact or plate 831 may be located on the outer surface of the monolithic glass element. In both cases, the conductive contact or plate may be a thin conductive plate or coating, on or attached to the respective surface of the monolithic glass element. Conductive lines are provided from monitor circuitry 501 to the conductive contacts or elements 830, 831, and the tamper-respondent detector may monitor in this configuration capacitance or inductance of the stressed glass element. Should fragmentation of the stressed glass element occur, then the capacitance change between the contacts or plates 830, 831 would be detected by the monitor circuitry, thereby detecting the attempted intrusion event. In this regard, note that one or more circuit lines 835 may extend through, for instance, specially-configured exit portals of the monolithic glass element, or the multilayer circuit board 210. As described above, in one or more implementations, Z-shaped or other angled channels could be formed in the monolithic glass element through which electrical signal lines 835 pass. The angled channels advantageously provide secure ingress and egress of electrical signal lines to the secure volume 201, and in this case, to and from monitor circuitry 501.

FIG. 8D depicts a further variation, wherein tamper-respondent detector 505 comprises one or more optical emitters 840 and one or more optical detectors or receivers 841 for monitoring reflectance 842 of the stressed glass. As with other embodiments of tamper-proof electronic packages disclosed herein, multiple optical emitters and detectors or receivers 841 may be employed to monitor different portions of the stressed glass, particularly, for instance, in a configuration where multiple stressed glass elements are adhesively secured together to form the glass enclosure. In the example of FIG. 8D, glass enclosure 220' may comprise a single monolithic glass element, as described above in connection with FIG. 6. Together with multilayer circuit board 210, having embedded tamper-respondent sensors 300, glass enclosure 220' forms secure volume 201 within which one or more electronic components, such as one or more electronic devices or elements 202 may reside. In the tamper-proof electronic package 803 embodiment of FIG. 8D, monitor circuitry 501 may monitor for change in reflectance 842, which may indicate, for instance, fragmentation of the monolithic glass element. With fragmentation, reflectance 842 would, for instance, be lost, in which case the attempted tamper intrusion event would be detected by the tamper-respondent detector 505.

In an alternate embodiment, the tamper-respondent detector 505 could utilize the glass enclosure as a waveguide, providing one or more emitters and one or more optical detectors in association with an inner surface of the glass enclosure for transmitting and receiving an optical signal through the glass enclosure. Security may be further enhanced by modulating the signal being transmitted through the glass enclosure to any desired pattern, for instance, with only the monitor circuitry within the secure volume of the tamper-proof electronic package knowing of the correct signal modulation for the optical signal passing through the glass enclosure.

As noted, in one or more embodiments, responsive to detecting an attempted intrusion event into the stressed glass, the tamper-respondent detector signals an erase circuit to erase any confidential information within the secure volume. This confidential information is typically stored in volatile memory to allow for fast erasure of information upon detection of an attempted intrusion event. However, volatile memory requires a certain amount of battery power to maintain the volatile memory active, and allow for the fast erasing of confidential information in the event of a tamper event. This requirement for battery power to provide protection in the event of a tamper event complicates the tamper-proof electronic packaging design by requiring additional power as part of the design.

Figure 9:
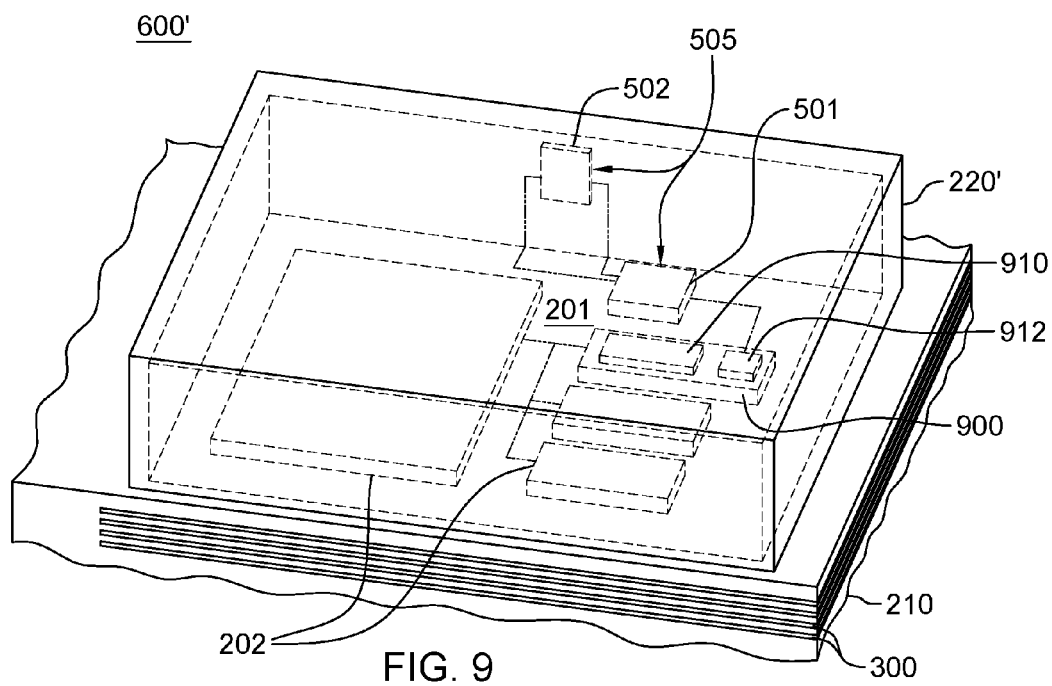
FIG. 9 illustrates a further embodiment of a tamper-proof electronic package, which includes (in part) an electronic component mounted to a glass substrate within a secure volume of the tamper-proof electronic package, in accordance with one or more aspects of the present invention.
Figure 10:
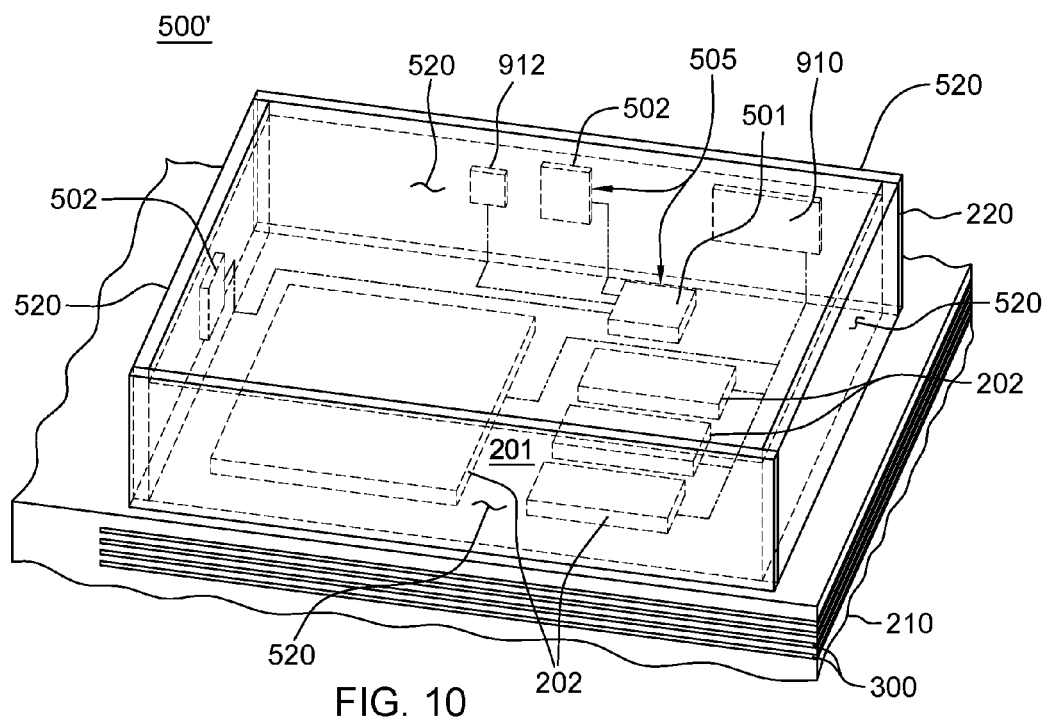
FIG. 10 depicts a further embodiment of a tamper-proof electronic package comprising (in part) an electronic component mounted to an inner surface of a glass enclosure formed of stressed glass, in accordance with one or more aspects of the present invention.
Figure 11:
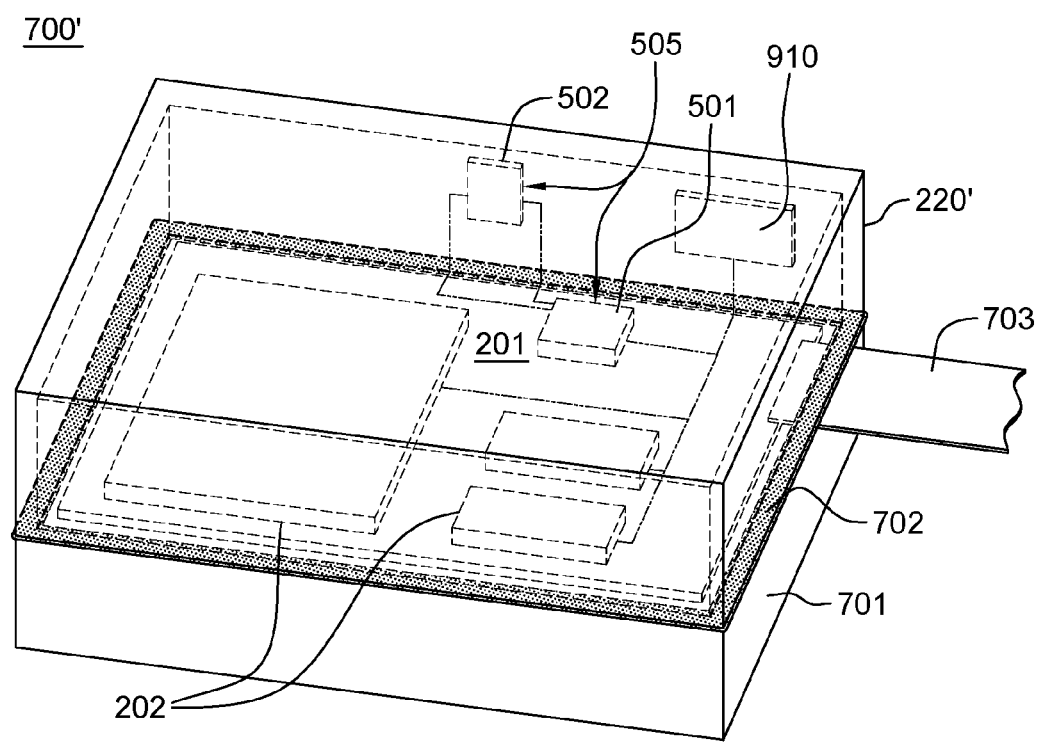
FIG. 11 depicts another embodiment of a tamper-proof electronic package including (in part) an electronic component mounted to an inner surface of a glass enclosure assembly formed of stressed glass, in accordance with one or more aspects of the present invention.

To address this, disclosed hereinbelow with reference to FIGS. 9-11 are exemplary alternative tamper-proof electronic packages which may be employed in combination with, for instance, persistent memory, to advantageously simplify the tamper-proof assembly, and reduce the need for battery power within the assembly in the event of a tamper event.

To summarize, in one or more enhanced embodiments, a tamper-proof electronic package in accordance with one or more aspects of the present invention may include a glass substrate which comprises stressed glass with a compressively-stressed surface layer, and one or more electronic components may be secured to the glass substrate within a secure volume of the tamper-proof electronic package. Advantageously, the glass substrate fragments with an attempted intrusion event into the tamper-proof electronic package, and the fragmenting of the glass substrate also physically fragments the electronic component(s) secured to the glass substrate, thereby destroying the electronic component(s). Various configurations for accomplishing this are described below and depicted, by way of example, in FIGS. 9-11.

Note that in one or more embodiments, the glass substrate may have undergone ion-exchange processing to provide the stressed glass with the compressively-stressed surface layer. In one or more implementations, the compressively-stressed surface layer of the stressed glass may be compressively stressed to ensure that the stressed glass fragments into glass particles of fragmentation size less than 1000 µms with the attempted intrusion event. Further, the one or more electronic components may be thinned to any desired thickness which ensures fragmenting of the electronic component(s) with fragmenting of the glass substrate to which it is adhesively secured using, for instance, a structural adhesive.

As noted, in one or more implementations, the electronic component(s) secured to the glass substrate may comprise one or more memory components, such as one or more persistent memory components adhesively secured to the glass substrate.

In one or more embodiments, the tamper-proof electronic package may include an enclosure to define, at least in part, the secure volume. Further, a tamper-respondent detector may monitor for the attempted intrusion event into the secure volume, and a fragmentation trigger element may be provided secured to the glass substrate. When present, the fragmentation trigger element operates to trigger fragmentation of the glass substrate responsive to the tamper-respondent detector detecting the attempted intrusion event into the secure volume.

In one or more implementations, the enclosure may be a glass enclosure defining, at least in part, the secure volume, with the glass enclosure comprising stressed glass with a compressively-stressed surface layer. For instance, the enclosure may comprise a plurality of stressed glass elements adhesively bonded together to form the enclosure, each stressed glass element comprising a respective, compressively-stressed surface layer, with the plurality of stressed glass elements defining multiple sides of the secure volume. In this implementation, one stressed glass element of the plurality of stressed glass elements may comprise or be the glass substrate, and the electronic component(s) and the fragmentation trigger element may both be secured to the one stressed glass element. In other implementations, the glass substrate may be located within the secure volume, and be separate from the enclosure. Further, note that in these implementations, the enclosure may be other than a glass enclosure.

In one or more implementations, the tamper-proof electronic package may include a glass enclosure which defines, at least in part, the secure volume. The glass enclosure may comprise stressed glass with a compressively-stressed surface layer, and the glass enclosure may be the glass substrate, with the electronic component(s) being adhesively coupled to an inner surface of the glass enclosure. By way of further example, the package may include an upper glass enclosure, and a base glass enclosure, with the upper glass enclosure and the base glass enclosure being adhesively secured together to define the secure volume, and both comprising stressed glass with a compressively-stressed surface layer. In such a configuration, the electronic component(s) may be adhesively secured to an inner surface of either enclosure.

Referring to FIG. 9, one embodiment of a tamper-proof electronic package, generally denoted 600', is presented, which includes a stressed glass component substrate, in accordance with one or more aspects of the present invention. By way of example, tamper-proof electronic package 600' is similar to tamper-proof electronic package 600 described above in connection with FIG. 6. In this embodiment, however, a glass substrate 900 is provided mounted, for instance, to a surface of multilayer circuit board 210 within secure volume 201. As noted above, glass enclosure 220' is adhesively secured to an upper surface of multilayer circuit board 210, and multilayer circuit board includes embedded tamper-respondent sensors 300, as well as one or more electronic components, such as electronic devices or elements 202 disposed within secure volume 201.

By way of example, glass enclosure 220' may be a machined, monolithic glass element comprising a multi-sided glass structure defining multiple sides of secure volume 201. In this example, fewer sensors 502 may be employed by tamper-respondent detector 505 to monitor for fragmentation of glass enclosure 220', since fragmentation of the entire elements would occur upon any attempt to penetrate the stressed glass from any direction, whether mechanically or chemically attaching the stressed glass, thereby triggering detection of the tamper event by monitor circuitry 501. As noted above, a monolithic glass element such as depicted in FIG. 9 could be formed from a single block of glass being hollowed out, for instance, by etching or other machining methods, to create a cavity that allows for the glass enclosure to accommodate the one or more electronic components to be protected within secure volume 201 between, for instance, glass enclosure 220' and multilayer circuit board 210. As with the embodiments described above, opacity of the glass enclosure may be provided to, for instance, prevent an intruder from having visibility into the secure volume of the tamper-proof electronic package.

As noted, as an enhancement, a separate glass substrate 900 may be provided within secure volume 201. This glass substrate 900 may be formed of stressed glass with a compressively-stressed surface layer, such as described herein for the glass enclosures. Note also that, although depicted in combination with glass enclosure 220', glass substrate 900 could be employed within the secure volume of any type of tamper-respondent assembly, irrespective of the type of enclosure employed.

One or more electronic components 910, such as one or more memory components, or more particularly, one or more persistent memory components, may be adhesively secured to glass substrate 900. Further, a fragmenting trigger element 912 may be secured to glass substrate 900. In operation, tamper-respondent detector 505 may detect an attempted intrusion event into secure volume 201, and in response, monitor circuitry 501 signals fragmenting trigger element 912 to fragment glass substrate 900. In one or more implementations, fragmenting trigger element 912 may comprise an electromechanical element which initiates fragmenting of the stressed glass substrate 900 with the tamper event. For instance, the electromechanical element could comprise a loaded spring which is released upon detection of a tamper event to push a nail into glass substrate 900, causing the glass substrate to fragment. Alternatively, in one or more implementations, fragmenting trigger element 912 may comprise a laser pointing at the glass substrate 900, which punctually heats the glass substrate to fragment upon detection of a tamper event.

Note that as with the glass enclosure embodiments described above, thickness of stressed glass substrate 900 may be tailored to a desired size for a particular application and a particular desired fragmentation size of fragmenting glass pieces resulting from the attempted tamper intrusion event.

Note also that electronic component(s) 910 adhesively bonded to glass substrate 900 may be thinned to a desired dimension to ensure fragmenting of electronic component(s) with fragmenting of glass substrate 900. For instance, the electronic component(s) may be thinned to a thickness of 100-200 µms, or less, with the thickness of the electronic component depending in part on, for instance, the material employed in fabricating the component. As one specific example, a silicon-on-insulator (SOI) component may be thinned to 150 µms, or less, and direct-chip-attached to glass substrate 900. In such a configuration, fragmenting of the underlying glass substrate, which may have a thickness in the range of the glass enclosure thicknesses described above, ensures physical fragmenting and destruction of the electronic component(s) as well. In operation, the fragmenting glass substrate essentially pulls the electronic component(s) apart in pieces, commensurate with fragmenting of the glass into pieces. Any of various adhesives which bond well to glass may be employed. For instance, the above-referenced Henkel Locktite Hysol EA 9360 AERO epoxy adhesive could be employed to strongly secure electronic component(s) 910 to glass substrate 900.

As noted, by facilitating physical destruction of the electronic component(s) upon detection of a tamper event, persistent memory may be employed within the secure volume, reducing the need for battery power to operate a quick erasure of volatile memory, as in prior approaches.

FIG. 10 depicts an alternate implementation of a tamper-proof electronic package 500', which is similar to tamper-proof electronic package 500 of FIG. 5, with the exception of one or more electronic component(s) 910, as well as a fragmenting trigger element 912 being added to, for instance, a stressed glass element 520 of glass enclosure 220. As noted, glass enclosure 220 in this example may be formed of a plurality of stressed glass elements 520 adhesively bonded together. Each stressed glass element 520 may include one or more respective, compressively-stressed surface layers, and together, the plurality of stressed glass elements 520 define multiple sides of secure volume 201. Stressed glass elements 520 may be adhesively secured together using, for instance, the same structural adhesive used in securing glass enclosure 220 to, for instance, multilayer circuit board 210, which as noted above, may comprise multiple embedded tamper-respondent sensors 300.

Tamper-respondent detector 505 may be provided, comprising monitor circuitry 501 and multiple sensors 502, with each sensor 502 being associated with a respective, stressed glass element 520 (in one or more embodiments). By way of example, two sensors 502 are depicted in FIG. 10 for clarity. In one or more implementations, sensors 502 may be designed or configured to ensure fragmenting of the sensor with fragmenting of the attached stressed glass element 520, and thereby detection of the tamper event.

In one or more implementations, each stressed glass element 520 comprises, for instance, ion-exchange glass, formed as described above. Where the glass elements are assembled and adhesively secured together as depicted in FIG. 10, they form glass enclosure 220 enclosing, for instance, the electronic devices or elements 202 within secure volume 201 of tamper-proof electronic package 500'.

In this implementation, one or more electronic components 910 are adhesively secured to an inner surface of one or more stressed glass elements 520. As noted above, the electronic component(s) 910 are sized to fragment with fragmenting of the attached glass substrate, or stressed glass element 520. Fragmenting of the stressed glass element 520 supporting electronic component(s) 910 may be ensured by also attaching fragmenting trigger element 912 to an inner surface of the stressed glass element 520 having electronic component(s) 910 secured thereto. In this way, upon monitor circuitry 501 detecting a tamper event through, for instance, a different portion of the tamper-respondent electronic package 500', the monitor circuitry 501 may signal the trigger element to initiate fragmenting of the stressed glass element 520 supporting electronic component(s) 910, and thereby physical destruction of the electronic component. This advantageously provides a different mechanism for destroying confidential information within the secure volume upon detection of an attempted tamper event into the secure volume. As illustrated, conductive lines may be provided coupling the electronic component(s) 910 mounted to the inner surface of stressed glass element 520 to one or more other electronic components or devices 202 within secure volume 201. Electronic component thicknesses and exemplary adhesives may be as described above.

FIG. 11 depicts another embodiment of a tamper-proof electronic package 700', in accordance with one or more aspects of the present invention. In this embodiment, the multilayer circuit board of FIG. 9 is replaced by, for instance, a base glass enclosure 701 structurally, adhesively bonded 702 to glass enclosure 220', which in this assembly, is an upper glass enclosure. Together, the upper and lower glass enclosures 220', 701 substantially form a 360° glass enclosure about secure volume 201, accommodating the electronic components, including electronic devices or elements 202 to be protected. Base glass enclosure 701 may also comprise stressed glass, with one or more compressively-stressed surface layers, such as described herein. Note that the thickness of the upper and lower glass enclosures 220', 701 may be the same or different. As with the embodiment of FIG. 7, tamper-respondent detector 505 is provided and may include monitor circuitry 501 and one or more sensors 502. Depending on the implementation, sensors 502 may be optionally provided. When provided, one sensor 502 may be associated with upper glass enclosure 220', and in one or more embodiments, another sensor (not shown) may be associated with base glass enclosure 701, such that an attempted intrusion event through any portion of the tamper-proof electronic package results in a fragmentation of at least the corresponding upper or base glass enclosure, and thereby detection of the tamper event to allow for one or more actions to be taken to protect any confidential information within secure volume 201. Alternatively, in one or more embodiments, structural adhesive 702 may sufficiently bond upper enclosure 220' and base glass enclosure 701 such that fragmentation of one, necessarily results in fragmentation of the other, in which case sensors 502 may be omitted.

In addition to structural adhesive 702, tamper-proof electronic package 700' may include one or more sensors, such as exposed conductive lines or traces on one or both of the upper and base glass enclosures, for instance, where joined via adhesive 702. Thus, any pulling apart of the adhesive would necessarily result in damage to the conductive trace(s) at the interface, and thereby, detection of an attempted intrusion event through the adhesive. Electrical signals may be provided into or from the secure volume 201 via one or more signal lines 703 extending through, for instance, specially-configured exit portals of base glass enclosure 701. For instance, in one or more implementations, Z-shaped, or other angled channels, could be formed in base enclosure 701 through which electrical signal lines 703 may pass. The angled channels may be formed to provide a mechanically-secured egress and ingress of electrical signal line 703 from and to secure volume 201.

In this embodiment, one or more electronic component(s) 910 are adhesively secured to an inner surface of one of the enclosures, for instance, stressed glass enclosure 220', such that any fragmenting of stressed glass enclosure 220' also results in fragmenting of electronic component(s) 910, as described herein. If desired, a fragmenting trigger element (not shown) could be provided coupled to glass enclosure 220' to, for instance, ensure fragmenting of the upper glass enclosure 220' with an attempted intrusion event through the base glass enclosure 701.

In one or more other embodiments, a multilayer circuit board may be provided with, for instance, the upper glass enclosure bonding to an upper surface of the multilayer circuit board, and the base glass enclosure bonding to a lower surface of the multilayer circuit board. For instance, the multilayer circuit board and the upper and base glass enclosures could be sized and configured such that the upper glass enclosure bonds to the multilayer circuit board about a periphery of the multilayer circuit board, and the base glass enclosure bonds to the lower surface of the multilayer circuit board about a periphery of the multilayer circuit board. In this configuration, one or more tamper-respondent sensors may be embedded within the multilayer circuit board about the periphery of the multilayer circuit board, and tied to the monitor circuitry within the secure volume. For instance, the one or more tamper-respondent sensors may include at least one peripheral tamper-detect circuit defined, at least in part, by a plurality of through-substrate vias extending through or within the multilayer circuit board, for instance, between the upper and lower surfaces of the multilayer circuit board. The peripheral tamper-detect circuit(s) could electrically connect to the monitor circuitry of the tamper-respondent detector to facilitate defining the secure volume for accommodating the one or more electronic components.

Note also with respect to FIGS. 9-11, that although depicted with reference to a single electronic component 910 being adhesively secured to a glass substrate 900 (FIG. 9), 520 (FIG. 10), 220' (FIG. 11), that multiple electronic components could be adhesively secured to the glass substrate. For instance, if more than one persistent memory component is desired within the secure volume, then the multiple persistent memories could be adhesively secured to a common, or different, stressed glass substrates designed to fragment, as discussed herein, with detection of an attempted intrusion event into the secure volume of the tamper-proof electronic package.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A tamper-proof electronic package comprising:
    a glass substrate, the glass substrate comprising stressed glass with a compressively-stressed surface layer;
    at least one electronic component secured to the glass substrate within a secure volume of the tamper-proof electronic package;
    a multilayer circuit board, the glass substrate being coupled to the multilayer circuit board;
    an embedded tamper-respondent sensor disposed within the multilayer circuit board; and
    wherein the glass substrate fragments with an attempted intrusion event into the tamper-proof electronic package, the fragmenting of the glass substrate also fragmenting the at least one electronic component secured thereto, destroying the at least one electronic component, the glass substrate and the embedded tamper-respondent sensor within the multilayer circuit board together facilitating defining the secure volume of the tamper-proof electronic package.

2. The tamper-proof electronic package of claim 1, wherein the glass substrate has undergone ion-exchange processing to provide the stressed glass with the compressively-stressed surface layer.

3. The tamper-proof electronic package of claim 1, wherein the compressively-stressed surface layer of the stressed glass is compressively stressed to ensure that the stressed glass fragments into glass particles of fragmentation size less than 1000 μms with the attempted intrusion event.

4. The tamper-proof electronic package of claim 1, wherein the at least one electronic component comprises at least one memory component, the at least one memory component comprising persistent memory adhesively secured to the glass substrate.

5. The tamper-proof electronic package of claim 1, further comprising:
    an enclosure defining, at least in part, the secure volume.

6. The tamper-proof electronic package of claim 5, further comprising:
    a tamper-respondent detector monitoring for the attempted intrusion event into the secure volume; and
    a fragmenting trigger element secured to the glass substrate to trigger fragmentation of the glass substrate with the tamper-respondent detector detecting the attempted intrusion event into the secure volume.

7. The tamper-proof electronic package of claim 6, wherein the enclosure is a glass enclosure defining, at least in part, the secure volume, the glass enclosure comprising stressed glass with a compressively-stressed surface layer.

8. The tamper-proof electronic package of claim 6, wherein the enclosure comprises a plurality of stressed glass elements adhesively bonded together to form the enclosure, each stressed glass element comprising a respective, compressively-stressed surface layer, and the plurality of stressed glass elements defining multiple sides of the secure volume, and wherein one stressed glass element of the plurality of stressed glass elements comprises the glass substrate, and the at least one electronic component and the fragmentation trigger element are adhesively secured to the one stressed glass element.

9. The tamper-proof electronic package of claim 6, wherein the glass substrate is located within the secure volume, and is separate from the enclosure.

10. A tamper-proof electronic package comprising:
a glass substrate, the glass substrate comprising stressed glass with a compressively-stressed surface layer;
at least one electronic component secured to the glass substrate within a secure volume of the tamper-proof electronic package;
a glass enclosure defining, at least in part, the secure volume, the glass enclosure comprising stressed glass with a compressively-stressed surface layer, and wherein the glass enclosure is the glass substrate, and the at least one electronic component is adhesively coupled to an inner surface of the glass enclosure;
wherein the glass substrate fragments with an attempted intrusion event into the tamper-proof electronic package, the fragmenting of the glass substrate also fragmenting the at least one electronic component secured thereto, destroying the at least one electronic component; and
wherein the glass enclosure is an upper glass enclosure, and the tamper-proof electronic package further comprises a base glass enclosure, the upper glass enclosure and the base glass enclosure being adhesively secured together to define the secure volume, and wherein the base glass enclosure also comprises stressed glass with a compressively-stressed surface layer.

11. A fabrication method comprising:
fabricating a tamper-proof electronic package, the fabricating comprising:
providing a glass substrate, the glass substrate comprising stressed glass with a compressively-stressed surface layer;
securing at least one electronic component to the glass substrate, and the glass substrate being within a secure volume of the tamper-proof electronic package;
providing a multilayer circuit board and coupling the glass substrate to the multilayer circuit board;
providing an embedded tamper-respondent sensor disposed within the multilayer circuit board; and
wherein the glass substrate fragments with an attempted intrusion event into the secure volume of the tamper-proof electronic package, the fragmenting of the glass substrate also fragmenting the at least one electronic component secured thereto, destroying the at least one electronic component, the glass substrate and the embedded tamper-respondent sensor within the multilayer circuit board together facilitating defining the secure volume of the tamper-proof electronic package.

12. The method of claim 11, wherein providing the glass substrate comprises machining the glass substrate to a desired configuration, and then ion-exchange processing the glass substrate to obtain the stressed glass with the compressively-stressed surface layer, and wherein the at least one electronic component comprises at least one memory component, the at least one memory component comprising persistent memory, and the method comprises adhesively securing the persistent memory to the glass substrate.

13. The method of claim 11, further comprising:
providing an enclosure defining, at least in part, the secure volume;
providing a tamper-respondent detector monitoring for the attempted intrusion event into the secure volume; and
providing a fragmenting trigger element secured to the glass substrate to trigger fragmentation of the glass substrate with the tamper-responding detector detecting the attempted intrusion event into the secure volume.

* * * * *